(12) United States Patent
Fujimoto et al.

(10) Patent No.: US 8,503,163 B2
(45) Date of Patent: *Aug. 6, 2013

(54) ELECTROLYTIC CAPACITOR

(75) Inventors: Kazumasa Fujimoto, Saga (JP); Satoshi Aikawa, Ogi (JP)

(73) Assignees: SANYO Electric Co., Ltd., Moriguchi-shi, Osaka (JP); Saga Sanyo Industries Co., Ltd., Kishima-gun, Saga (JP)

( * ) Notice: Subject to any disclaimer, the term of this patent is extended or adjusted under 35 U.S.C. 154(b) by 520 days.

This patent is subject to a terminal disclaimer.

(21) Appl. No.: 12/637,070

(22) Filed: Dec. 14, 2009

(65) Prior Publication Data

US 2010/0091433 A1    Apr. 15, 2010

Related U.S. Application Data

(63) Continuation of application No. 11/600,781, filed on Nov. 17, 2006, now Pat. No. 7,663,864.

(30) Foreign Application Priority Data

Nov. 22, 2005  (JP) ................................. 2005-337413
Aug. 29, 2006  (JP) ................................. 2006-231567

(51) Int. Cl.
*H01G 4/32* (2006.01)
*H01G 9/04* (2006.01)
*H01G 9/08* (2006.01)

(52) U.S. Cl.
USPC ............................ 361/511; 361/517; 361/522

(58) Field of Classification Search
USPC ................. 361/522, 541, 508–512, 517–520, 361/523–531, 526–540
See application file for complete search history.

(56) References Cited

U.S. PATENT DOCUMENTS

| 2,055,216 A | 9/1936 | Edelman |
| 3,010,056 A | 11/1961 | Kurland et al. |
| 3,803,457 A * | 4/1974 | Yamamoto ................... 361/522 |

(Continued)

FOREIGN PATENT DOCUMENTS

| CN | 1499547 A | 5/2004 |
| JP | 51106042 A | 9/1976 |

(Continued)

OTHER PUBLICATIONS

Japanese Office Action dated Apr. 6, 2010, issued in corresponding Japanese Patent Application No. 2006-231567.

(Continued)

*Primary Examiner* — Eric Thomas
(74) *Attorney, Agent, or Firm* — Westerman, Hattori, Daniels & Adrian, LLP

(57) ABSTRACT

The electrolytic capacitor includes two chemically processed anode foils, two cathode foils, four separator sheets, four lead tab terminals, two anode leads and two cathode leads. The two chemically processed anode foils, two cathode foils and four separator sheets are arranged alternately and rolled, to form a capacitor element. Two lead tab terminals are connected to the two chemically processed anode foils, respectively, and the remaining two lead tab terminals are connected to two cathode foils, respectively. The two anode leads are connected to two lead tab terminals, respectively, and the two cathode leads are connected to two lead tab terminals, respectively. As a result, equivalent series resistance can stably be reduced.

7 Claims, 22 Drawing Sheets

U.S. PATENT DOCUMENTS

| | | | |
|---|---|---|---|
| 4,868,717 A | 9/1989 | Tyler | |
| 5,930,109 A * | 7/1999 | Fishler | 361/508 |
| 6,377,442 B1 * | 4/2002 | Strange et al. | 361/508 |
| 2004/0100756 A1 | 5/2004 | Koizumi et al. | |
| 2008/0030927 A1 | 2/2008 | Sherwood | |

FOREIGN PATENT DOCUMENTS

| | | |
|---|---|---|
| JP | 5231370 A | 3/1977 |
| JP | 5256353 A | 5/1977 |
| JP | 5317963 A | 2/1978 |
| JP | 5812933 U | 1/1983 |
| JP | 5995622 U | 6/1984 |
| JP | 6448409 A | 2/1989 |
| JP | 3293710 A | 12/1991 |
| JP | 09232189 A | 9/1997 |
| JP | 2001284173 A | 10/2001 |
| JP | 2002246278 A | 8/2002 |
| JP | 2003264126 A | 9/2003 |
| JP | 2004-179621 A | 6/2004 |
| JP | D1242591 S | 6/2005 |
| JP | 2005203402 A | 7/2005 |

OTHER PUBLICATIONS

Japanese Office Action dated Apr. 6, 2010, issued in corresponding Japanese Patent Application No. 2008-229454.
Japanese Office Action dated Apr. 6, 2010, issued in corresponding Japanese Patent Application No. 2008-242069.
Japanese Office Action dated Aug. 3, 2010, issued in corresponding Japanese Patent Application No. 2010-005910.
Chinese Office Action dated Aug. 12, 2010, issued in corresponding Chinese Patent Application No. 200610162414.X.
Taiwanese Office Action dated Nov. 30, 2010, issued in corresponding Taiwanese Application No. 095133072.

* cited by examiner

ELECTROLYTIC CAPACITOR

This application is a continuation application of U.S. application Ser. No. 11/600,781 filed on Nov. 17, 2006 now U.S. Pat. No. 7,663,864. The priority applications numbers JP2005-337413 filed on Nov. 22, 2005 and JP2006-231567 filed on Aug. 29, 2006 of the above parent application are hereby incorporated by reference. The U.S. application Ser. No. 11/600,781 issued as U.S. Pat. No. 7,663,864 on Feb. 16, 2010.

BACKGROUND OF THE INVENTION

1. Field of the Invention

The present invention relates to an electrolytic capacitor allowing reduction of equivalent series resistance.

2. Description of the Background Art

Recently, there have been demands for electric circuits that are smaller in size and adapted for high-frequency applications. With this trend, capacitors of lower impedance become necessary. Particularly, in designing a circuit for driving a CPU (Central Processing unit) of a computer, a switching power supply circuit and the like, absorption of high-frequency noise and ripple current is necessary, and therefore, a capacitor of which equivalent series resistance (ESR) can be made low has been required.

FIG. 27 is a perspective view showing a structure of a conventional aluminum-rolled solid electrolytic capacitor. Referring to FIG. 27, the conventional aluminum-rolled solid electrolytic capacitor 100 includes a chemically processed anode foil 110, a cathode foil 120, a separator sheet 130, a securing tape 140, lead tab terminals 160, 170, an anode lead 180 and a cathode lead 190.

Chemically processed anode foil 110, cathode foil 120 and separator sheet 130 are rolled such that separator sheet 130 is positioned between chemically processed anode foil 110 and cathode foil 120. Securing tape 140 tapes ends of the rolled chemically processed anode foil 110, cathode foil 120 and separator sheet 130, and thus, a capacitor element 150 is formed.

Lead tab terminal 160 is connected to chemically processed anode foil 110 to protrude from an end surface of capacitor element 150, while lead tab terminal 170 is connected to cathode foil 120 to protrude from the end surface of capacitor element 150. Anode lead 180 is connected to lead tab terminal 160 and cathode lead 190 is connected to lead tab terminal 170.

Conventionally, as a method of reducing equivalent series resistance, connecting two leads to each of the chemically processed anode foil and cathode foil has been known (Japanese Patent Laying-Open No. 2004-179621). FIG. 28 shows a method of connecting two anode leads to the chemically processed anode foil. Referring to FIG. 28, two lead tab terminals 160a and 160b are connected, spaced by a prescribed distance from each other, to chemically processed anode foil 110. Two anode leads 180a and 180b are respectively connected to lead tab terminals 160a and 160b.

Two cathode leads are connected to cathode foil 120 in the similar manner as two anode leads 180a and 180b are connected to chemically processed anode foil 110.

FIG. 29 is another illustration showing a method of connecting two anode leads to the chemically processed anode foil. Referring to FIG. 29, a lead tab terminal 160c is connected to chemically processed anode foil 110, and two anode leads 180a and 180b are connected, spaced by a prescribed distance from each other, to lead tab terminal 160c. Two cathode leads are connected to cathode foil 120 in the similar manner as two anode leads 180a and 180b are connected to chemically processed anode foil 110.

In the conventional aluminum-rolled solid electrolytic capacitor, equivalent series resistance can be reduced to about 2.0 mΩ.

As described above, it has been known that equivalent series resistance can be reduced by connecting two leads to each of the chemically processed anode foil and the cathode foil.

According to the conventional method of reducing equivalent series resistance, however, a plurality of anode leads are connected to the chemically processed anode foil and a plurality of cathode leads are connected to the cathode foil, and therefore, it has been difficult to fabricate an aluminum-rolled electrolytic capacitor while maintaining constant the positions for connecting the plurality of anode leads to the chemically processed anode foil and the positions for connecting the plurality of cathode leads to the cathode foil.

Consequently, it has been difficult to fabricate an aluminum electrolytic capacitor with low ESR in a stable manner. Specifically, dependent on the position of connection between the anode lead and the chemically processed anode foil and the position of connection between the cathode lead and the cathode foil, the equivalent series resistance varies (Japanese Patent Laying-Open No. 2005-203402), and therefore, it is difficult to connect the plurality of anode leads and a plurality of cathode leads to the chemically processed anode foil and the cathode foil every time at the same positions to fabricate aluminum electrolytic capacitors having approximately the same equivalent series resistance.

SUMMARY OF THE INVENTION

The present invention was made to solve these problems, and its object is to provide an electrolytic capacitor allowing stable reduction of equivalent series resistance.

According to an aspect, the present invention provides a rolled type electrolytic capacitor containing an electrolyte, including i (i is an integer not smaller than 2) anode members, j (j is an integer satisfying $1 \leq j < i$) cathode members, and k (k is an integer not smaller than 2) separator members, wherein i anode members are electrically insulated from each other and each has a dielectric coating film on its surface, j cathode members are rolled together with the i anode members, and k separator members are arranged between at least i anode members and j cathode members and rolled together with the i anode members and j cathode members.

According to another aspect, the present invention provides a rolled type electrolytic capacitor containing an electrolyte, including i (i is an integer not smaller than 2) anode members, i cathode members and k (k is an integer not smaller than 2) separator members. Here, i anode members are electrically insulated from each other and each has a dielectric coating film on its surface, i cathode members are rolled together with the i anode members, and i separator members are each arranged between adjacent anode member and cathode member, and rolled together with the i anode members and i cathode members. The diameter when i anode members, i cathode members and k separator members are rolled is approximately the same as the diameter of a reference electrolytic capacitor formed by rolling one anode member and one cathode member with one or two separator sheets inserted therebetween.

Preferably, the i anode members, the i cathode members and the k separator members include n (n is an integer not smaller than 2) anode members, n cathode members and 2n or 2n−1 separator members. Each of the anode members, cathode members and separator members has approximately 1/n the length of the anode member, the cathode member and the separator member of the reference electrolytic capacitor.

Preferably, the diameter attained when the i anode members, the j cathode members and the k separator members are rolled is approximately the same as the diameter of the reference electrolytic capacitor having one anode member and one cathode member rolled with one or two separator members interposed.

Preferably, a capacitor element formed by rolling the n anode members, the n cathode members and the 2n or 2n−1 separator members includes n capacitors arranged at radially different positions.

Preferably, the i anode members and the j cathode members respectively include n (n is an integer not smaller than 2) anode members and m (m is an integer satisfying $1 \leq m < n$) cathode members, length of the anode member is approximately 1/n the length of the anode member in the reference electrolytic capacitor, and length of the cathode member is approximately 1/m the length of the cathode member in the reference electrolytic capacitor.

Preferably, a capacitor element formed by rolling the n anode members, the m cathode members and the k separator members includes n capacitors arranged at radially different positions.

Preferably, the m cathode members include one cathode member.

Preferably, the i anode members, the j cathode members and the k separator members form a plurality of capacitors having mutually different capacitances.

Preferably, the electrolytic capacitor further includes a sealing member. The sealing member seals the capacitor element formed by rolling i anode members, i or j cathode members and k separator members. The sealing member is formed of resin.

Preferably, the electrolytic capacitor further includes a sealing member. The sealing member seals the capacitor element formed by rolling i anode members, i or j cathode members and k separator members. The sealing member is formed of rubber.

Preferably, the electrolytic capacitor further includes i anode leads, j cathode leads, an anode electrode and a cathode electrode. The i anode leads are provided corresponding to i anode members, and each lead is connected to approximately the center of the corresponding anode member in the lengthwise direction of the corresponding anode member. The i cathode leads are provided corresponding to the i or j cathode members, and each lead is connected to approximately the center of the corresponding cathode member in the lengthwise direction of the corresponding cathode member. The anode terminal is connected to the i anode leads. The cathode terminal is connected to the i cathode leads. The i anode leads have one end connected to i anode members and the other end opposite to the one end connected to the anode terminal. The i cathode leads have one end connected to j cathode members and the other end opposite to the one end connected to the cathode terminal.

Preferably, the electrolyte is solid electrolyte formed of polythiophene-group, polypyrrole-group or polyaniline-group conductive polymer or solid electrolyte of 7,7,8,8-tetracyano-quinodimethane (TCNQ) complex salt.

The electrolytic capacitor in accordance with the present invention is formed by a plurality of anode members and at least one cathode member arranged alternately and rolled with a separator member interposed. The electrolytic capacitor attains the same effect as attained by a plurality of capacitor elements connected in parallel. Specifically, the electrolytic capacitor has the sum of capacitor capacitance of each of the plurality of capacitor elements, and the equivalent series resistance is reduced to about the original value divided by the number of the plurality of capacitor elements.

Therefore, by the present invention, the equivalent series resistance of the electrolytic capacitor can be reduced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
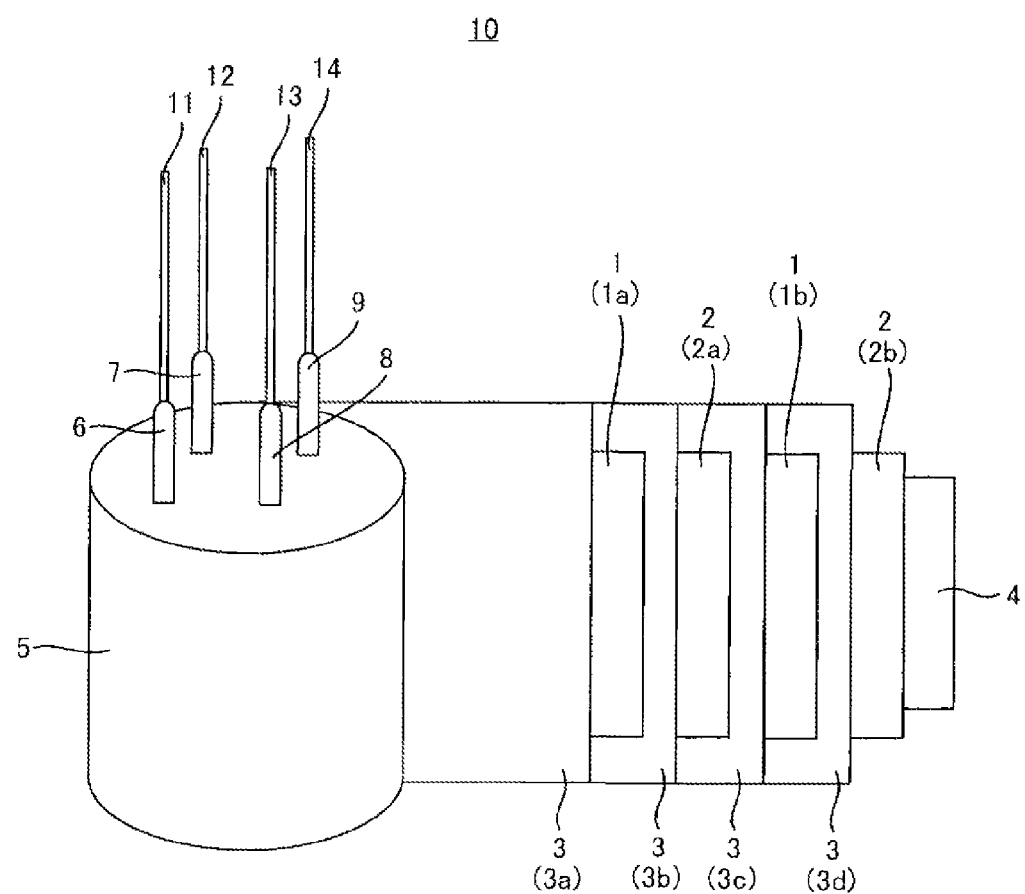
FIG. 1 is a perspective view showing a structure of an electrolytic capacitor in accordance with Embodiment 1 of the present invention.

Embodiments of the present invention will be described in detail with reference to the figures. Throughout the figures, the same or corresponding portions are denoted by the same reference characters and description thereof will not be repeated.

Embodiment 1

Figure 2:
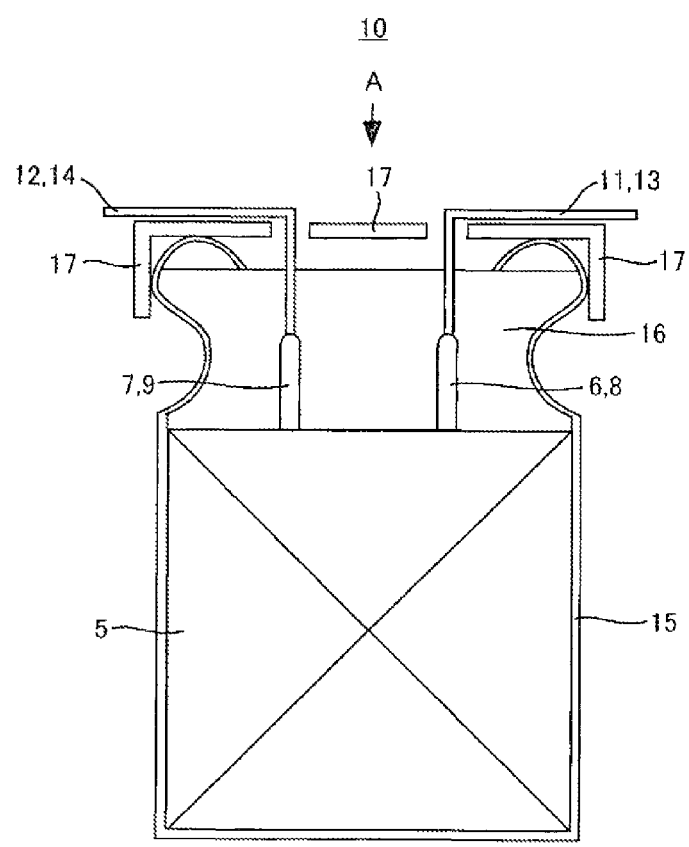
FIG. 2 is a cross-sectional view showing a structure of the electrolytic capacitor in accordance with Embodiment 1 of the present invention.

FIG. 1 is a perspective view showing a structure of an electrolytic capacitor in accordance with Embodiment 1 of the present invention. FIG. 2 is a cross-sectional view showing a structure of the electrolytic capacitor in accordance with Embodiment 1 of the present invention. Referring to FIGS. 1 and 2, an electrolytic capacitor 10 in accordance with Embodiment 1 of the present invention includes a chemically processed anode foil 1, a cathode foil 2, a separator sheet 3, a securing tape 4, lead tab terminals 6 to 9, anode leads 11, 12, cathode leads 13, 14, a case 15, a rubber packing 16, and a seat plate 17.

Electrolytic capacitor 10 is, by way of example, an electrolytic capacitor including solid electrolyte.

Chemically processed anode foil 1 includes two chemically processed anode foils 1a and 1b. Each of the two chemically processed anode foils 1a and 1b is formed of aluminum foil with its surface chemically processed. Therefore, each of the two chemically processed anode foils 1a and 1b has its surface made rough and has an oxide film formed on the roughened surface.

Cathode foil 2 includes two cathode foils 2a and 2b. Each of the two cathode foils 2a and 2b is formed of aluminum foil. Separator sheet 3 includes four separator sheets 3a to 3d.

Separator sheet 3a, chemically processed anode foil 1a, separator sheet 3b, cathode foil 2a, separator sheet 3c, chemically processed anode foil 1b, separator sheet 3d and cathode foil 2b are arranged successively, and the arranged separator sheet 3a, chemically processed anode foil 1a, separator sheet 3b, cathode foil 2a, separator sheet 3c, chemically processed anode foil 1b, separator sheet 3d and cathode foil 2b are rolled. Then, ends of the rolled separator sheet 3a, chemically processed anode foil 1a, separator sheet 3b, cathode foil 2a, separator sheet 3c, chemically processed anode foil 1b, separator sheet 3d and cathode foil 2b are secured by securing tape 4. In this manner, a capacitor element 5 is formed.

In capacitor element 5, chemically processed anode foil 1a, separator sheet 3b and cathode foil 2a form one capacitor element 5a, while chemically processed anode foil 1b, separator sheet 3d and cathode foil 2b form one capacitor element 5b.

Lead tab terminal 6 is connected to chemically processed anode foil 1a, and lead tab terminal 7 is connected to chemically processed anode foil 1b. Further, lead tab terminal 8 is connected to cathode foil 2a, and lead tab terminal 9 is connected to cathode foil 2b.

Anode leads 11 and 12 are connected to lead tab terminals 6 and 7, respectively, and cathode leads 13 and 14 are connected to lead tab terminals 8 and 9, respectively.

Case 15 is formed of aluminum, and houses capacitor element 5, lead tab terminals 6 to 9, anode leads 11 and 12 and cathode leads 13 and 14. Rubber packing 16 seals capacitor element 5 and lead tab terminals 6 to 9 in case 15. Seat plate 17 fixes anode leads 11 and 12 as well as cathode leads 13 and 14. Anode leads 11 and 12 and cathode leads 13 and 14 are bent along seat plate 17 when capacitor element 5 is put in case 15.

Figure 3:
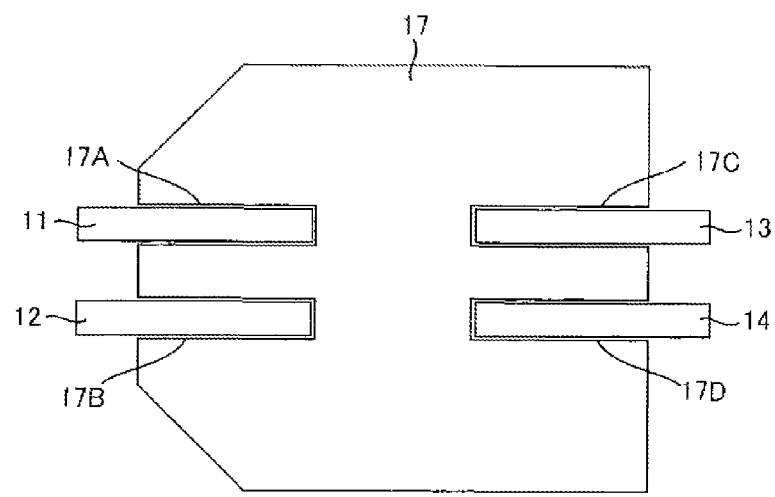
FIG. 3 is a plan view of the electrolytic capacitor viewed from the direction A of FIG. 2.

FIG. 3 is a plan view of electrolytic capacitor 10 viewed from the direction A of FIG. 2. Referring to FIG. 3, seat plate 17 has an approximately rectangular planar shape, and has cut outs 17A to 17D. Anode leads 11 and 12 and cathode leads 13 and 14 are bent to the inner side of seat plate 17 to be fit in cut outs 17A to 17D of seat plate 17.

The bent two anode leads 11 and 12 and two cathode leads 13 and 14 are used as terminals of electrolytic capacitor 10. Therefore, electrolytic capacitor 10 is an electrolytic capacitor having a 4-terminal structure.

Figure 4:
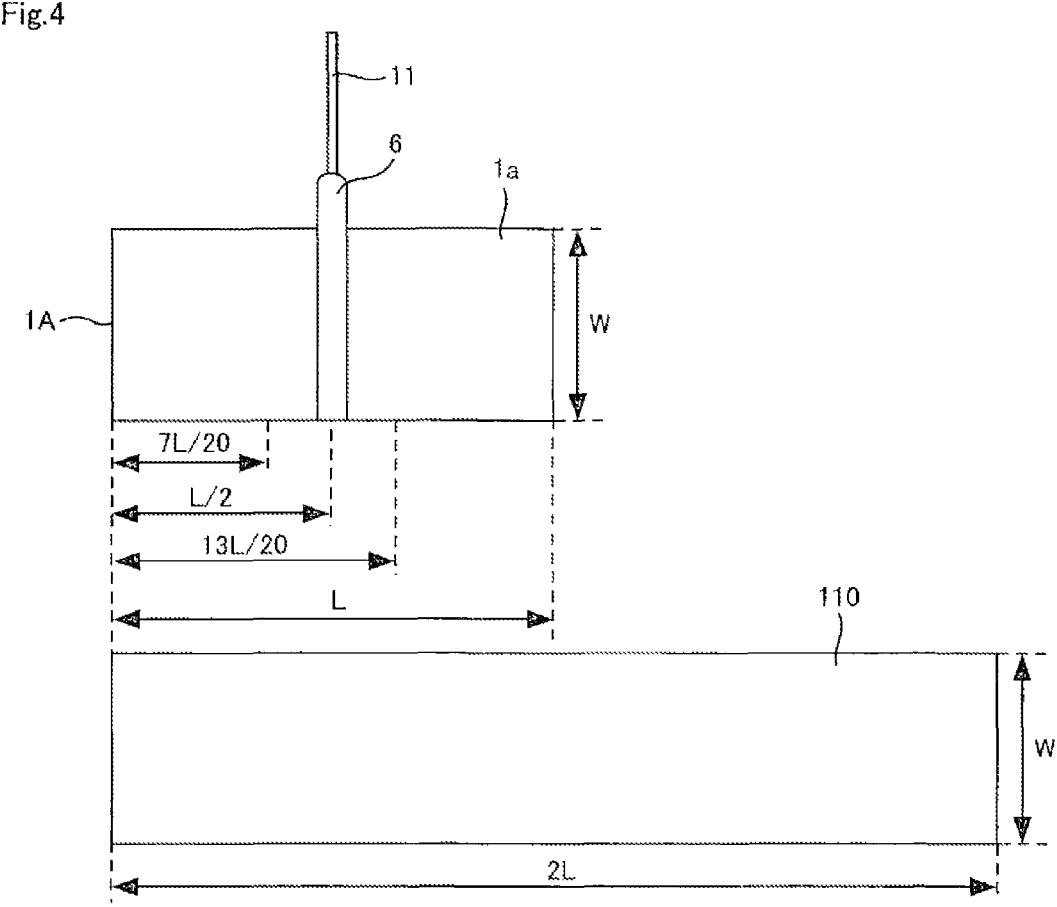
FIG. 4 is a plan view illustrating in detail the chemically processed anode foil and the lead tab terminal.

FIG. 4 is a plan view illustrating in detail chemically processed anode foil 1a and lead tab terminal 6. Referring to FIG. 4, chemically formed anode film 1a has a rectangular planar shape, of which length L is one-half the length 2L of a conventional chemically processed anode foil 110 and the width W is the same as that of the conventional chemically processed anode foil 110.

Lead tab terminal 6 is connected to chemically formed cathode foil 1a at a position of L/2 from a rolling start end 1A of chemically processed anode foil 1a. In this manner, lead tab terminal 6 is connected at the central portion of chemically processed anode foil 1a along the lengthwise direction of chemically processed anode foil 1a.

Chemically processed anode foil 1b and each of cathode foils 2a and 2b have the same length L and the same width W as chemically processed anode foil 1a. Lead tab terminals 7 to 9 are respectively connected to the central portion of chemically processed anode foil 1b and cathode foils 2a and 2b.

Separator sheet 3 (3a~3d) is longer than chemically processed anode foil 1 and cathode foil 2, and wider than chemically processed anode foil 1 and cathode foil 2. This is to prevent short-circuit between chemically processed anode foil 1 and cathode foil 2.

As described above, chemically processed anode foil 1 and cathode foil 2 have the length L, which is half the length 2L of conventional chemically processed anode foil 110, and the width W, which is the same as that of conventional chemically processed anode foil 110. Therefore, the area S of each of chemically processed anode foil 1 and cathode foil 2 becomes one-half the area S0 of conventional chemically processed anode foil 110. As a result, capacitance C of each of capacitor elements 5a and 5b becomes one-half the capacitance C0 of a capacitor element formed by using chemically processed anode foil 110.

Capacitor element 5, however, has the same effect as attained by two capacitor elements 5a and 5b having the capacitance C connected in parallel, and therefore, the resulting capacitance becomes 2C (=C0). Namely, it is the same as the capacitance C0 of conventional aluminum rolled solid electrolytic capacitor 100 formed by rolling one chemically processed anode foil 110 and one cathode foil 120 with one separator sheet 130 interposed.

Therefore, even though electrolytic capacitor 10 is fabricated by using chemically processed anode foil 1 and cathode foil 2 having one-half the length of conventional chemically processed anode foil 110, its capacitance is not smaller than that of conventional aluminum rolled solid electrolytic capacitor 100.

Further, electrolytic capacitor 10 is fabricated by rolling chemically processed anode foil 1 and cathode foil 2 having one-half the length of conventional chemically processed anode foil 110, the diameter after rolling is approximately the same as the conventional aluminum rolled solid electrolytic capacitor 100. In other words, it becomes possible to fabricate electrolytic capacitor 10 while maintaining the capacitance and not enlarging the size from that of conventional aluminum rolled solid electrolytic capacitor 100.

Figure 5:
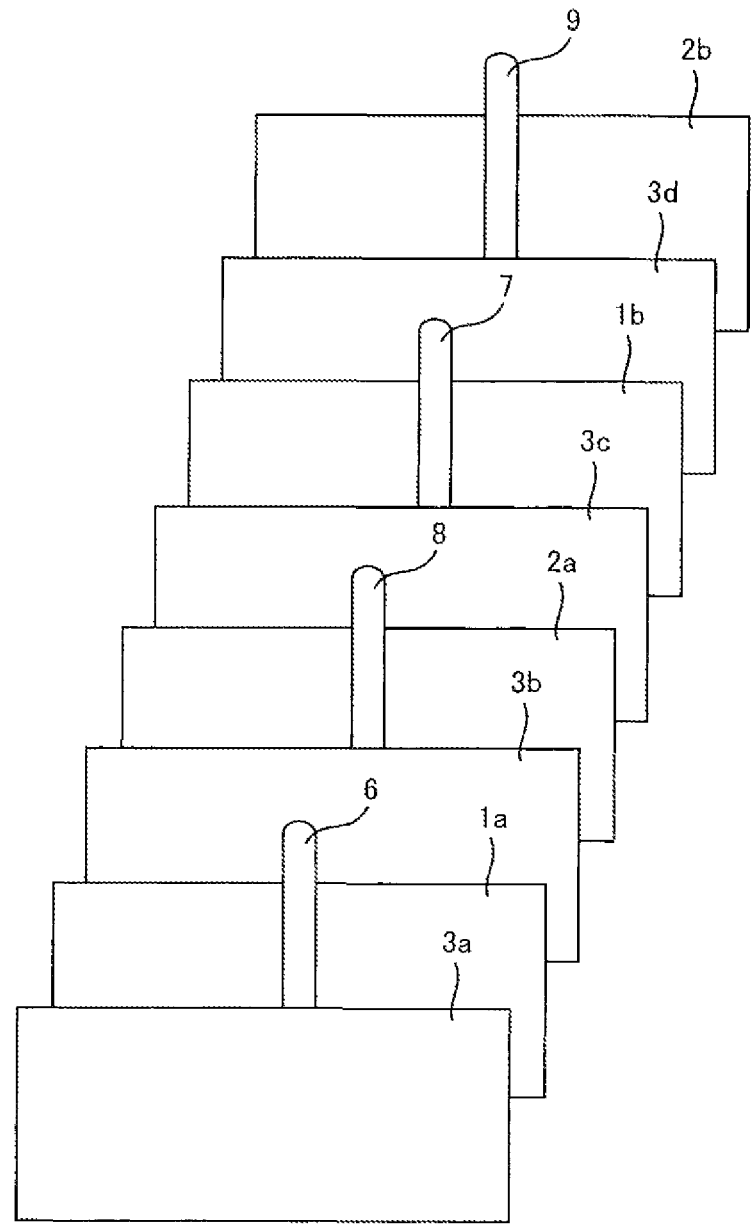
FIG. 5 is a perspective view showing the method of arranging two chemically processed anode foils, two cathode foils and four separator sheets.
Figure 6:
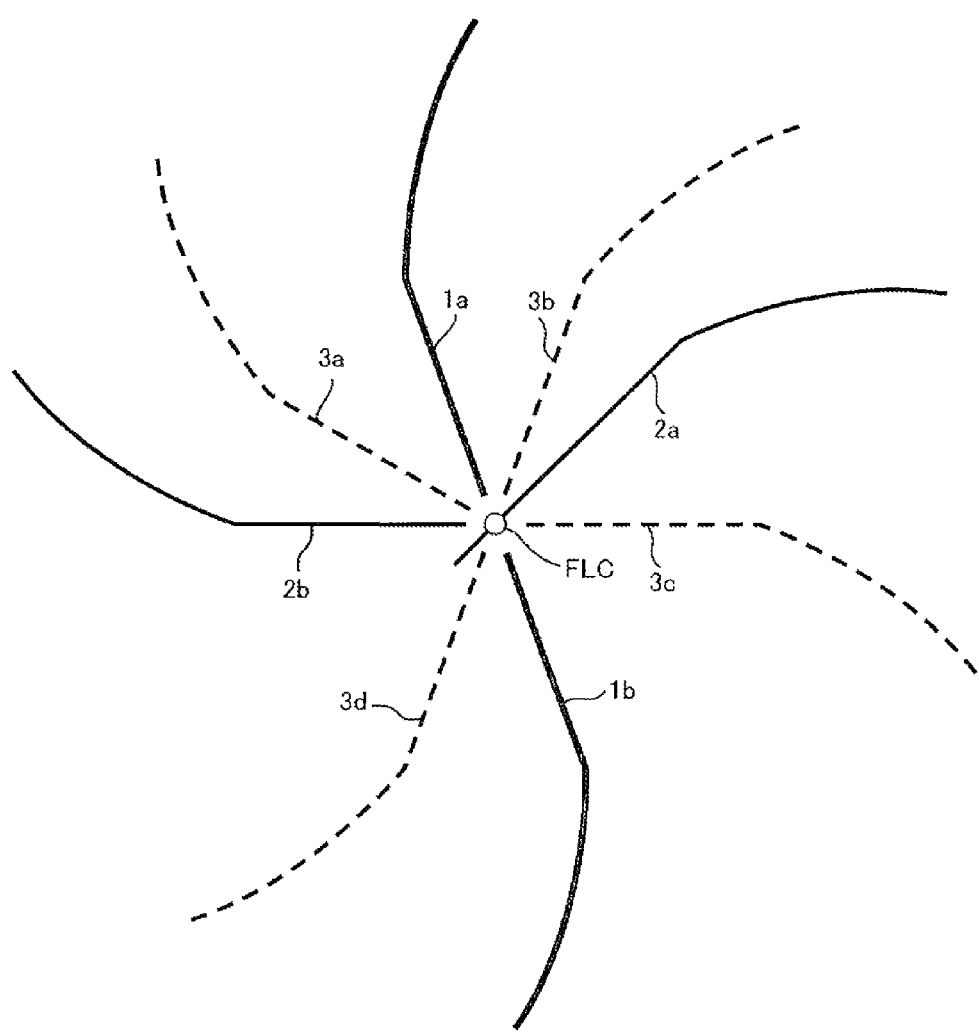
FIG. 6 is an illustration showing a method of rolling the chemically processed anode foils, the cathode foils and the separator sheets.

The method of fabricating electrolytic capacitor 10 will be described. FIG. 5 is a perspective view showing the method of arranging two chemically processed anode foils 1a and 1b, two cathode foils 2a and 2b, and four separator sheets 3a to 3d. FIG. 6 is an illustration showing a method of rolling chemically processed anode foils 1a and 1b, cathode foils 2a and 2b, and separator sheets 3a to 3d. First, a surface of large aluminum foil is etched and then chemically processed. The chemically processed aluminum foil is cut, to provide two aluminum foils having a prescribed dimension (length L and width W), and thus two chemically processed anode foils 1a and 1b are formed.

Next, by the similar method as forming chemically processed anode foils 1a and 1b, two cathode foils 2a, 2b having the prescribed dimension (length L and width W) are fabricated. Further, four separator sheets of a prescribed dimension (length L+α, width W+α) are cut, as separator sheets 3a to 3d.

Thereafter, anode leads 11 and 12 are respectively connected to lead tab terminals 6 and 7, and cathode leads 13 and 14 are respectively connected to lead tab terminals 8 and 9. Then, lead tab terminals 6 and 7 are connected to the central portion of chemically processed anode foils 1a and 1b, respectively, and lead tab terminals 8 and 9 are connected to the central portion of cathode foils 2a and 2b, respectively.

Thereafter, the two chemically processed anode foils 1a and 1b, two cathode foils 2a and 2b and four separator sheets 3a to 3d are arranged in the manner as shown in FIG. 5 and rolled. Specifically, two chemically processed anode foils 1a and 1b, two cathode foils 2a and 2b and four separator sheets 3a to 3d are arranged such that rolling start ends of two chemically processed anode foils 1a and 1b, two cathode foils 2a and 2b and four separator sheets 3a to 3d are aligned, and two chemically processed anode foils 1a and 1b, two cathode foils 2a and 2b and four separator sheets 3a to 3d are rolled. More specifically, two chemically processed anode foils 1a and 1b, two cathode foils 2a and 2b and four separator sheets 3a to 3d are arranged in the manner as shown in FIG. 6, and two chemically processed anode foils 1a and 1b, two cathode foils 2a and 2b and four separator sheets 3a to 3d are rotated clockwise (or counterclockwise) about a fulcrum FLC, so that two chemically processed anode foils 1a and 1b, two cathode foils 2a and 2b and four separator sheets 3a to 3d are rolled. Thus, capacitor element 5 is fabricated. It is noted that two chemically processed anode foils 1a and 1b, two cathode foils 2a and 2b and four separator sheets 3a to 3d may be rolled with the rolling start ends of two chemically processed anode foils 1a and 1b, two cathode foils 2a and 2b and four separator sheets 3a to 3d not aligned.

Thereafter, capacitor element 5 having lead tab terminals 6 to 9, anode leads 11 and 12, and cathode leads 13 and 14 connected thereto is subjected to cut-edge chemical processing and heat treatment at 150° C. to 300° C., and capacitor element 5 is impregnated with a mixture. The mixture contains a monomer that will be a conductive polymer through polymerization, and an alcoholic solution of ferric p-toluene sulfonic acid as an oxidizer solution.

Then, by thermochemical polymerization, a layer of conductive polymer is formed between two electrodes of capacitor element 5. Consequently, capacitor element 5 comes to include an electrolyte. The electrolyte is, by way of example, polythiophene-group, polypyrrole-group or polyaniline-group conductive polymer or solid electrolyte of 7,7,8,8-tetracyano-quinodimethane (TCNQ) complex salt. After impregnation of capacitor element 5 with the electrolyte, rubber packing 16 is inserted to capacitor element 5, and capacitor element 5 having rubber packing 16 inserted is put and fixed in case 15.

Thereafter, an opening of case 15 is laterally drawn and curled to seal rubber packing 16 and capacitor element 5, and aging process is conducted. Thereafter, seat plate 17 is inserted to the curled surface of capacitor element 5, and anode leads 11 and 12 and cathode leads 13 and 14 as electrode terminals are pressed and bent. Thus, electrolytic capacitor 10 is completed.

Figure 7:
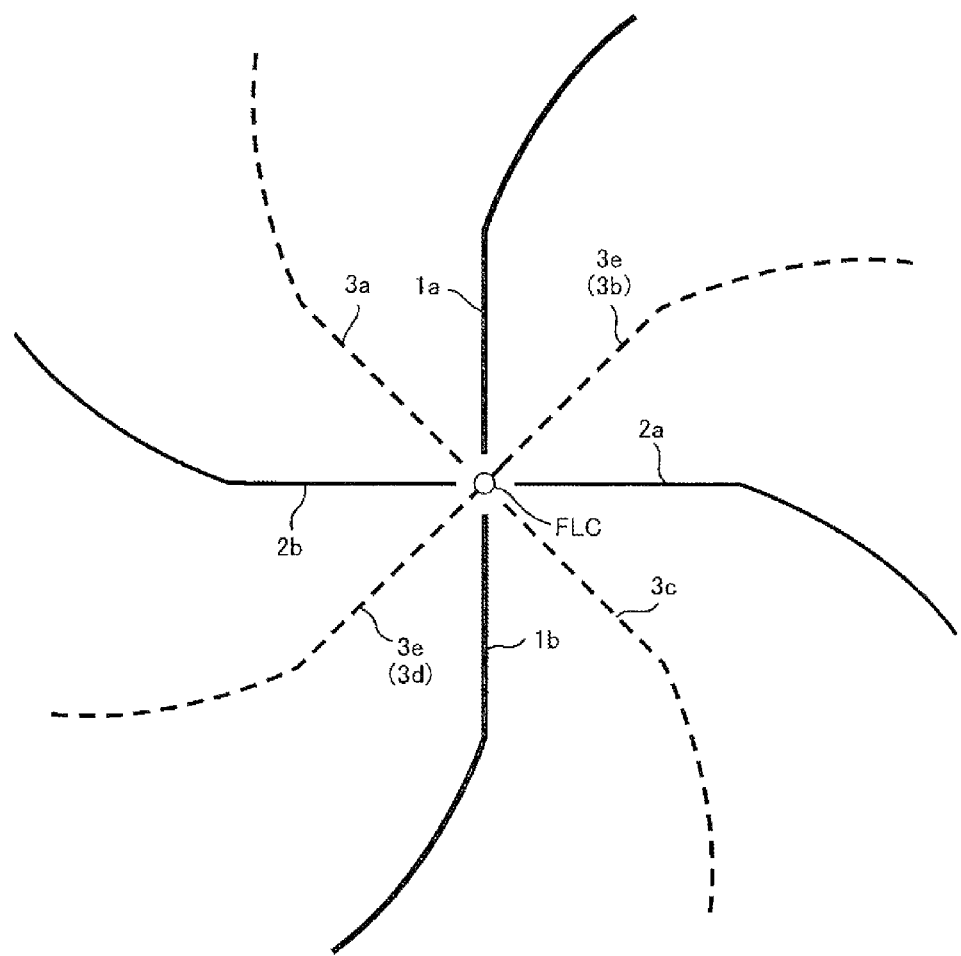
FIG. 7 is another illustration showing a method of rolling the chemically processed anode foils, the cathode foils and the separator sheets.

FIG. 7 is another illustration showing a method of rolling chemically processed anode foils 1a and 1b, the cathode foils 2a and 2b and the separator sheets 3a to 3d. Electrolytic capacitor 10 may be fabricated in the following manner. Two chemically processed anode foils 1a and 1b and two cathode foils 2a and 2b are formed in the similar manner as described above.

Thereafter, two separator sheets 3a and 3c having the length L+α and width W+α, and one separator sheet 3e having the length 2 L+α and width W+α are prepared. Then, anode leads 11 and 12 are respectively connected to lead tab terminals 6 and 7, and cathode leads 13 and 14 are respectively connected to lead tab terminals 8 and 9. Thereafter, lead tab terminals 6 and 7 are connected respectively to the central portion of chemically formed cathode foils 1a and 1b, and lead tab terminals 8 and 9 are respectively connected to the central portion of cathode foils 2a and 2b.

Then, two chemically processed anode foils 1a and 1b, two cathode foils 2a and 2b and three separator sheets 3a, 3c and 3e are arranged in the manner as shown in FIG. 6, and two chemically processed anode foils 1a and 1b, two cathode foils 2a and 2b and three separator sheets 3a, 3c and 3e are rotated clockwise (or counterclockwise) about the fulcrum FLC, so that two chemically processed anode foils 1a and 1b, two cathode foils 2a and 2b and three separator sheets 3a, 3c and 3e are rolled. Thus, capacitor element 5 is fabricated.

Thereafter, electrolytic capacitor 10 is fabricated by the same method as described above. When electrolytic capacitor 10 is formed in the manner as shown in FIG. 7, rolled separator sheet 3e serves as separator sheets 3b and 3d.

Further, according to the present invention, electrolytic capacitor 10 may be fabricated in the following manner. The method of fabrication described below is to fabricate electrolytic capacitor 10 by using a roll of aluminum foil having a prescribed width (500 mm). First, a surface of the aluminum foil having the prescribed width (500 mm) is etched and then chemically processed, and two chemically processed anode foils 1a and 1b and two cathode foils 2a and 2b are formed.

Thereafter, anode leads 11 and 12 are respectively connected to lead tab terminal 6 and 7, and cathode leads 13 and 14 are respectively connected to lead tab terminals 8 and 9. Then, lead tab terminals 6 and 7 are respectively connected to the central portion of chemically processed anode foils 1a and 1b, and lead tab terminals 8 and 9 are respectively connected to the central portion of cathode foils 2a and 2b.

Then, two chemically formed cathode foils 1a and 1b (in a roll) and two cathode foils 2a and 2b (in a roll) and four separator sheets (in a roll) having a prescribed width W+α are rolled in the manner as shown in FIG. 6 or FIG. 7, and cut in a prescribed length L. Thus, capacitor element 5 is fabricated.

Thereafter, electrolytic capacitor 10 is fabricated by the same method as described above.

When electrolytic capacitor 10 is fabricated using two chemically processed anode foils 1a and 1b and two cathode foils 2a and 2b in the manner as described above, four or three separator sheets are used.

Next, electric characteristics of electrolytic capacitor 10 will be described. Table 1 shows, in comparison, electric characteristics of electrolytic capacitor 10 in accordance with Embodiment 1 and the conventional electrolytic capacitor.

TABLE 1

|  | Cathode foil | Number of electrode foils | Capacitance (μF) | tanδ (%) | ESR (mΩ) |
| --- | --- | --- | --- | --- | --- |
| Conventional Example 1 | Aluminum foil | 1 | 565 | 2.5 | 5.5 |
| Example 1 | Aluminum foil | 2 | 562 | 2.4 | 2.8 |
| Example 2 | Aluminum foil | 3 | 563 | 2.5 | 1.9 |
| Conventional Example 2 | Aluminum nitride film | 1 | 1520 | 1.8 | 7.0 |
| Example 3 | Aluminum nitride film | 2 | 1560 | 1.8 | 3.6 |
| Example 4 | Aluminum nitride film | 3 | 1530 | 1.9 | 2.4 |

In Table 1, Conventional Examples 1 and 2 represent electrolytic capacitors including only one capacitor element 150 fabricated by using chemically processed anode foil 110 and cathode foil 120 having the length 2L, while Example 1 represents electrolytic capacitor 10 fabricated by using two chemically processed anode foils 1 and two cathode foils 2.

Example 2 represents electrolytic capacitor 10 fabricated by using three chemically processed anode foils 1 and three cathode foils 2, and Example 3 represents electrolytic capacitor 10 fabricated by using two chemically processed anode foils 1 and two cathode foils 2 with cathode foil 2 replaced by one prepared by forming titanium aluminum nitride film on the surface of aluminum foil.

Further, Example 4 represents electrolytic capacitor 10 fabricated by using three chemically processed anode foils 1 and three cathode foils 2 with cathode foil 2 replaced by one prepared by forming titanium aluminum nitride film on the surface of aluminum foil.

Capacitance and dielectric tangent (tan δ) were measured at 120 Hz, and equivalent series resistance ESR was measured at 100 kHz.

The titanium aluminum nitride film was formed on the surface of aluminum foil by vapor deposition. Further, in the examples in which the number of chemically processed anode foils 1 and cathode foils 2 was set to three, the length of chemically processed anode foil 1 and cathode foil 2 was set to one-third of the length 2L of conventional chemically processed anode foil 110 and cathode foil 120. Further, the values of capacitance, dielectric tangent (tan δ) and equivalent series resistance ESR shown in Table 1 are average values of 30 samples.

From the results shown in Table 1, it can be seen that the capacitance and dielectric tangent (tan δ) of electrolytic capacitor 10 are approximately the same as those of Conventional Examples 1 and 2. When the number of chemically processed anode foils 1 and cathode foils 2 is two, equivalent series resistance ESR of electrolytic capacitor 10 in accordance with the present invention is reduced to about one-half that of Conventional Examples 1 and 2 (see Examples 1 and 3).

Further, when the number of chemically processed anode foils 1 and cathode foils 2 is three, equivalent series resistance ESR of electrolytic capacitor 10 in accordance with the present invention is reduced to about one-third that of Conventional Examples 1 and 2 (see Examples 2 and 4).

Therefore, when the number of chemically processed anode foils 1 and cathode foils 2 is set to two or three and the length of chemically processed anode foils 1 and cathode foils 2 is set to one-half or one-third of the length 2L of the conventional chemically processed anode foil 110 and cathode foil 120, it is possible to reduce equivalent series resistance ESR to about one-half or one-third, while the capacitance and dielectric tangent of electrolytic capacitor 10 are maintained.

Specifically, by rolling two or three chemically processed anode foils 1 and cathode foils 2 with separator sheets 3 interposed, it becomes possible to fabricate the electrolytic capacitor 10 having the same effect as attained by two or three capacitor elements connected in parallel.

In Table 1, Conventional Example 2 and Examples 3 and 4 have larger capacitance than Conventional Example 1 and Examples 1 and 2, because connection between cathode foil 2 and the conductive polymer is improved by the titanium aluminum nitride film formed on the surface of cathode foil 2, and hence overall capacitance is increased. Specifically, when we represent the capacitor capacitance (electrostatic capacitance) as C, capacitance of the anode foil as Ca and capacitance of the cathode foil as Cc, the capacitor capacitance (electrostatic capacitance) is calculated as $1/C = 1/Ca + 1/Cc$. When the aluminum nitride film is formed on the surface of the cathode foil, the capacitance of cathode foil Cc is maximized (or increased to infinity) and capacitor capacitance (electrostatic capacitance) C comes as close as possible to zero. Therefore, capacitor capacitance (electrostatic capacitance) C attains C=Ca. As a result, even when the same anode foil is used, the capacitor capacitance increases.

Figure 8:
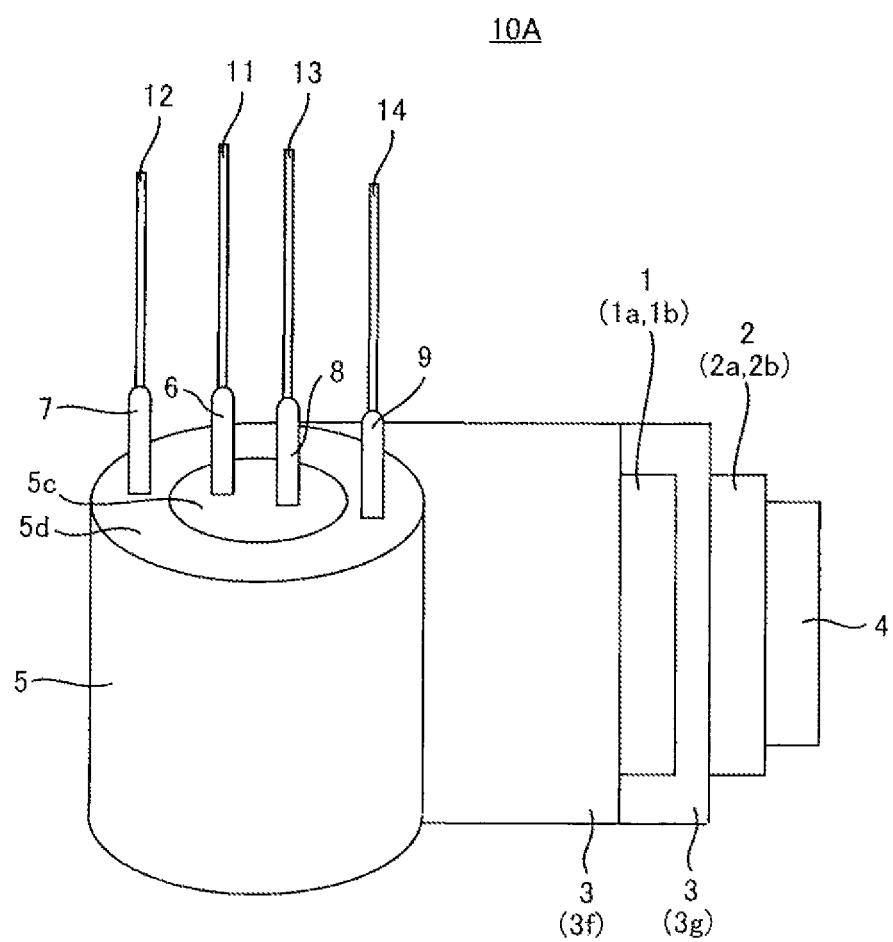
FIG. 8 is another perspective view showing the structure of the electrolytic capacitor in accordance with Embodiment 1 of the present invention.

FIG. 8 is another perspective view showing the structure of the electrolytic capacitor in accordance with Embodiment 1 of the present invention. The electrolytic capacitor in accordance with Embodiment 1 of the present invention may be an electrolytic capacitor 10A shown in FIG. 8. Referring to FIG. 8, electrolytic capacitor 10A is the same as electrolytic capacitor 10 except that separator sheets 3a to 3d of electrolytic capacitor 10 are replaced by separator sheets 3f and 3g.

Electrolytic capacitor 10A consists of two capacitor elements 5c and 5d, formed by rolling two chemically processed anode foils 1a and 1b, two cathode foils 2a and 2b, and two separator sheets 3f and 3g.

Capacitor element 5c consists of chemically processed anode foil 1a, cathode foil 2a and separator sheets 3f and 3g, and capacitor element 5d consists of chemically processed anode foil 1b, cathode foil 2b and separator sheets 3f and 3g. Capacitor element 5c is arranged on the inner circumferential side, and capacitor element 5d is arranged on the outer circumferential side. Therefore, it is the case that electrolytic capacitor 10A is formed of two capacitor elements 5c and 5d arranged at radially different positions.

Figure 9:
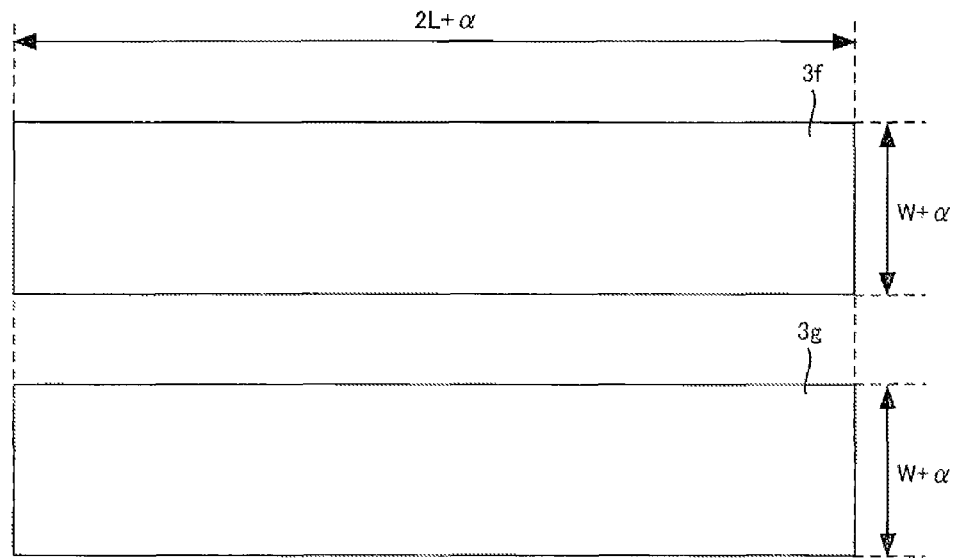
FIG. 9 is a plan view of the separator sheet shown in FIG. 8.

FIG. 9 is a plan view of separator sheets 3f and 3g shown in FIG. 8. Referring to FIG. 9, each of separator sheets 3f and 3g has the length 2L+α and the width W+α.

Figure 10:
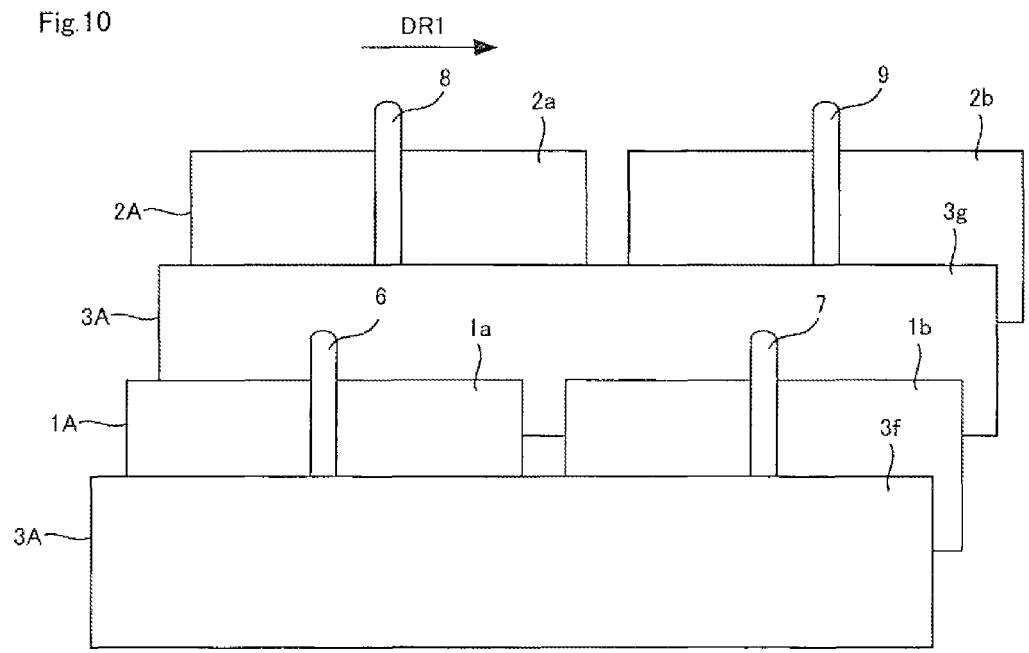
FIG. 10 is a perspective view showing a method of arranging the chemically processed anode foils, the cathode foils and the separator sheets when the electrolytic capacitor shown in FIG. 8 is fabricated.

FIG. 10 is a perspective view showing a method of arranging chemically processed anode foils 1a and 1b, cathode foils 2a and 2b and separator sheets 3f and 3g when electrolytic capacitor 10A shown in FIG. 8 is fabricated. Referring to FIG. 10, two chemically processed anode foils 1a and 1b are arranged continuously between separator sheets 3f and 3g. Here, two chemically processed anode foils 1a and 1b are arranged spaced by a prescribed distance to be electrically insulated from each other. Further, cathode foil 2a is arranged to be opposite to chemically processed anode foil 1a with separator sheet 3g interposed, and cathode foil 2b is arranged to be opposite to chemically processed anode foil 1b with separator sheet 3g interposed. As a result, two cathode foils 2a and 2b come to be arranged continuously in the direction of rolling DR1. Here, two cathode foils 2a and 2b are arranged spaced by a prescribed distance to be electrically insulated from each other. Thus, in electrolytic capacitor 10A, two chemically processed anode foils 1a and 1b and two cathode foils 2a and 2b are arranged continuously in the direction of rolling DR1.

By arranging two chemically processed anode foils 1a and 1b, two cathode foils 2a and 2b and two separator sheets 3f and 3g in the manner as shown in FIG. 10, and two chemically processed anode foils 1a and 1b, two cathode foils 2a and 2b and two separator sheets 3f and 3g are rolled from rolling start ends 1A, 2A and 3A in the direction of rolling DR1, so that capacitor element 5 including two capacitor elements 5c and 5d is formed. At the point where chemically processed anode foil 1a, cathode foil 2a and separator sheets 3f and 3g of the length L are rolled, capacitor element 5c is formed, and at the point where chemically processed anode foil 1b, cathode foil 2b and separator sheets 3f and 3g of the remaining length L are rolled, capacitor element 5d is formed.

Consequently, it follows that capacitor element 5c is arranged on the inner circumferential side, and capacitor element 5d is arranged on the outer circumferential side.

After forming capacitor element 5 by rolling two chemically processed anode foils 1a and 1b, two cathode foils 2a and 2b and two separator sheets 3f and 3g, electrolytic capacitor 10A is fabricated by the same method as that of fabricating electrolytic capacitor 10.

In fabricating electrolytic capacitor 10A, it is unnecessary that two chemically processed anode foils 1a and 1b, two cathode foils 2a and 2b and two separator sheets 3f and 3g are rolled from the rolling start ends 1A, 2A and 3A, and two chemically processed anode foils 1a and 1b, two cathode foils 2a and 2b and two separator sheets 3f and 3g may be rolled from the central portion of two separator sheets 3f and 3g. Dependent on the manner of rolling two chemically processed anode foils 1a and 1b, two cathode foils 2a and 2b and two separator sheets 3f and 3g, lead tab terminals 6 to 9 come to be arranged in a rectangle as shown in FIG. 1 or arranged linearly as shown in FIG. 8.

Further, in fabricating electrolytic capacitor 10A, two chemically processed anode foils 1a and 1b, two cathode foils 2a and 2b and two separator sheets 3f and 3g may be rolled with cathode foil 2b arranged at the position of cathode foil 2a, cathode foil 2a arranged at the position of chemically processed anode foil 1b, and chemically processed anode foil 1b arranged at the position of cathode foil 2b. Specifically, two chemically processed anode foils 1a and 1b, two cathode foils 2a and 2b and two separator sheets 3f and 3g may be rolled with foils of different poles arranged along the direction of rolling DR1.

In electrolytic capacitor 10A, each of capacitor elements 5c and 5d is formed of the chemically processed anode foil and the cathode foil having the length L and width W, and has capacitance C. Capacitor element 5 has the same effect as attained by two capacitor elements 5c and 5d connected in parallel, and therefore, its capacitance is 2C (=C0), which is the same as the capacitance C0 of the conventional aluminum rolled solid electrolytic capacitor 100.

Therefore, even though electrolytic capacitor 10A is fabricated by using chemically processed anode foils 1 and cathode foils 2 having one-half the length of conventional chemically processed anode foil 110, the capacitance is not smaller than the capacitance of the conventional aluminum rolled solid electrolytic capacitor 100, while equivalent series resistance becomes one-half that of the conventional aluminum rolled solid electrolytic capacitor 100.

Further, electrolytic capacitor 10A is formed by replacing conventional chemically processed anode foil 110 and cathode foil 120 with two chemically processed anode foils and two cathode foils, and therefore, the diameter after rolling is approximately the same as that of the conventional aluminum rolled solid electrolytic capacitor 100. In other words, it is possible to form electrolytic capacitor 10A having reduced equivalent series resistance while maintaining the capacitance and not making the size larger than the conventional aluminum rolled solid electrolytic capacitor 100.

Figure 11:
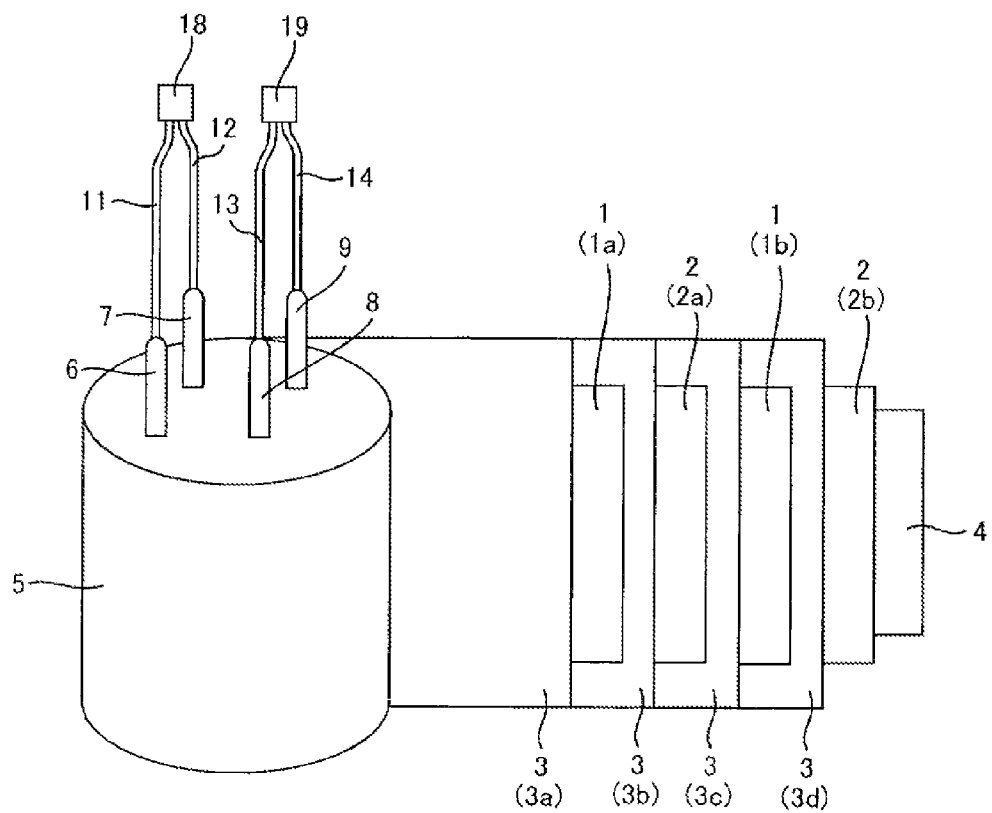
FIG. 11 is a still another perspective view showing the structure of the electrolytic capacitor in accordance with Embodiment 1 of the present invention.

FIG. 11 is a still another perspective view showing the structure of the electrolytic capacitor in accordance with Embodiment 1 of the present invention. The electrolytic capacitor in accordance with Embodiment 1 of the present invention may be a electrolytic capacitor 10B shown in FIG. 11. Referring to FIG. 11, electrolytic capacitor 10B is formed by adding an anode terminal 18 and a cathode terminal 19 to electrolytic capacitor 10 shown in FIG. 1, and except for this point, it is the same as electrolytic capacitor 10.

Anode terminal 18 is connected to two anode leads 11 and 12, and cathode terminal 19 is connected to two cathode leads 13 and 14. In this manner, in electrolytic capacitor 10B, two anode leads 11 and 12 and two cathode leads 13 and 14 are connected respectively to one anode terminal 18 and one cathode terminal 19. Therefore, electrolytic capacitor 10B is an electrolytic capacitor having a 2-terminal structure.

It is noted that in electrolytic capacitor 10B, two anode leads 11 and 12 and two cathode leads 13 and 14 may not be connected to one anode terminal 18 and one cathode terminal 19, respectively, and they may be bundled together for use.

Further, in Embodiment 1, anode terminal 18 and cathode terminal 19 may be added to electrolytic capacitor 10A.

Figure 12:
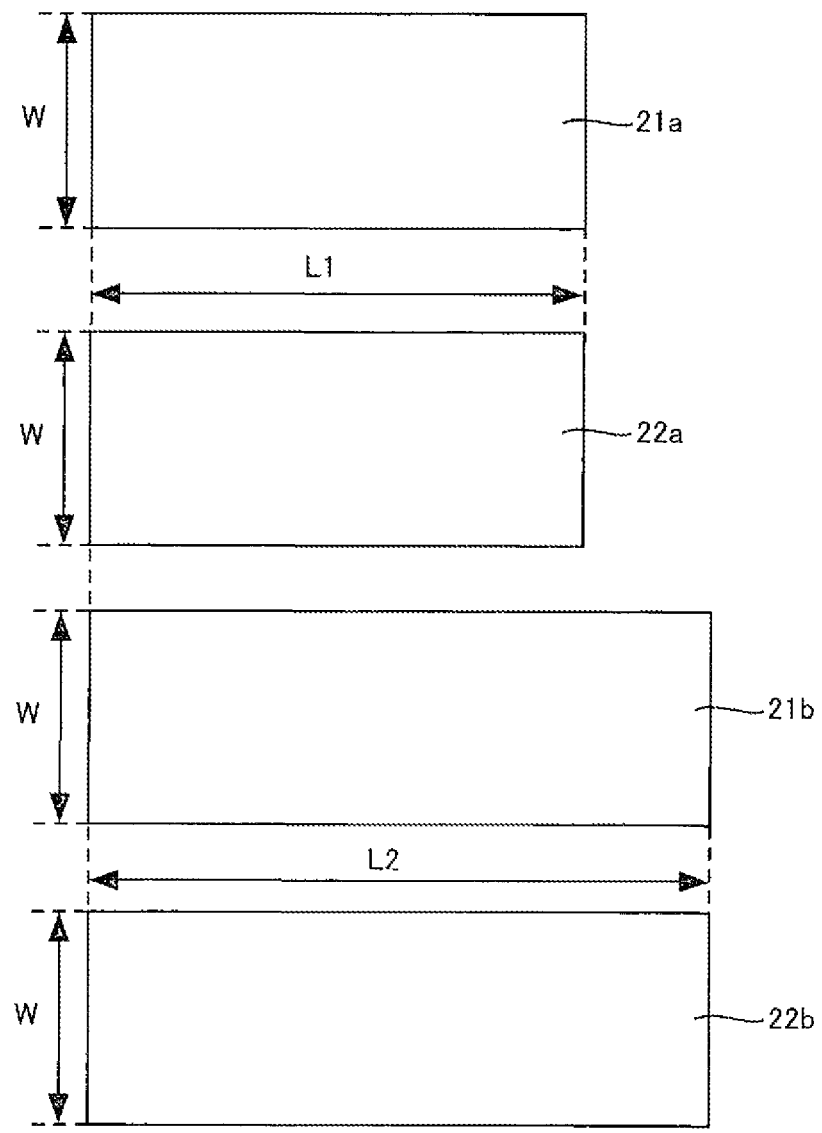
FIG. 12 is a plan view of the chemically processed anode foils and the cathode foils.

FIG. 12 is a plan view of the chemically processed anode foils and cathode foils. Referring to FIG. 12, a chemically processed anode foil 21a and a cathode foil 22a have the length L1 and width W, and a chemically processed anode foil 21b and a cathode foil 22b have the length L2 and width W. Here, L1+L2=2L.

In the present invention, chemically processed anode foils 1a and 1b and cathode foils 2a and 2b of electrolytic capacitor 10 and 10A may be replaced by chemically processed anode foils 21a and 21b and cathode foils 22a and 22b, respectively.

Here, capacitance of a capacitor element consisting of chemically processed anode foil 21a, separator sheet 3b and cathode foil 22a is different from that of a capacitor element consisting of chemically processed anode foil 21b, separator sheet 3d and cathode foil 22b.

Therefore, in the present invention, two capacitor elements contained in electrolytic capacitor 10 or 10A may have mutually different capacitances.

The method of setting capacitances of two capacitor elements contained in electrolytic capacitor 10 or 10A different from each other is not limited to the method in which the length of chemically processed anode foil and cathode foil in one capacitor element is set different from the length of chemically processed anode foil and cathode foil in the other capacitor element. A method in which the width of chemically processed anode foil and cathode foil in one capacitor element is set different from the width of chemically processed anode foil and cathode foil in the other capacitor element may be adopted.

Specifically, the method of setting capacitances of two capacitor elements contained in electrolytic capacitor 10 or 10A different from each other may be the method of setting the area of chemically processed anode foil and cathode foil in one capacitor element different from the area of chemically processed anode foil and cathode foil in the other capacitor element. In addition, a method of varying the foil type or varying the voltage for chemically processing the foil may be adopted.

In the foregoing, the number of chemically processed anode foils and cathode foils has been described as two or three. In the present invention, the number is not limited to these, and generally, the number of chemically processed anode foils and cathode foils may be n (n is an integer not smaller than 2).

In this case, the number of separator sheets is set to 2n or 2n−1, and the number of anode leads and the number of cathode leads are each set to n. Here, n anode leads may be connected to one anode terminal, and n cathode leads may be connected to one cathode terminal. When the diameter attained by rolling n chemically processed anode foils 1, n cathode foils 2 and 2n or 2n−1 separator sheets 3 is to be set approximately the same as the diameter attained by rolling one chemically processed anode foil 110, one cathode foil 120 and two separator sheets 130, the length of each of n chemically processed anode foils 1 and n cathode foils 2 is set to one-nth of the length of chemically processed anode foil 110 and cathode foil 120 when one chemically processed anode foil 110, one cathode foil 120 and one or two separator sheets 130 are rolled.

When electrolytic capacitor 10 or 10A is fabricated by rolling n chemically processed anode foils 1, n cathode foils 2 and 2n or 2n−1 separator sheets 3, electrolytic capacitor 10 or 10A comes to include n capacitor elements. In the present invention, the capacitances of n capacitor elements may be made different from each other through the methods described above.

In the foregoing, lead tab terminals 6 to 9 have been described as connected to the position of L/2 from the rolling start end 1A of chemically processed anode foils 1a and 1b and cathode foils 2a and 2b. It is not limiting, and in the present invention, lead tab terminals 6 to 9 may be connected to a position in the range of 7L/20 to 13L/20 from the rolling start end 1A of chemically processed anode foils 1a and 1b and cathode foils 2a and 2b.

The reason for this is that, as long as lead tab terminals 6 to 9 are connected to a position in the range of 7L/20 to 13L/20 from the rolling start end 1A of chemically processed anode foils 1a and 1b and cathode foils 2a and 2b, the equivalent series resistance of electrolytic capacitor 10 or 10A is almost constant.

Further, though electrolytic capacitors 10 and 10A have been described as containing solid electrolyte in the foregoing, the present invention is not limited thereto and electrolytic capacitor 10 or 10A may include liquid electrolyte. Specifically, electrolytic capacitor 10 and 10A have only to contain electrolyte, that is, either solid electrolyte or liquid electrolyte.

Further, though chemically processed anode foil 1 and cathode foil 2 have been described as formed of aluminum foil in the foregoing, the present invention is not limited thereto, and chemically processed anode foil 1 and cathode foil 2 may be vapor-deposited foil of valve metal oxide, vapor-deposited foil of single metal nitride, vapor-deposited foil of composite metal nitride, carbon foil or the like.

Further, electrolytic capacitor 10 or 10A in accordance with Embodiment 1 of the present invention may be fabricated by using chemically processed anode foil 1 and cathode foil 2 having the same length as that of chemically processed anode foil 110 and cathode foil 120 of aluminum rolled solid electrolytic capacitor 100. In that case, electrolytic capacitor 10 comes to have a capacitance larger than that of aluminum rolled solid electrolytic capacitor 100 and the diameter larger than that of aluminum rolled solid electrolytic capacitor 100.

In the present invention, the aluminum rolled solid electrolytic capacitor 100 fabricated by rolling one chemically processed anode foil 110, one cathode foil 120 and one or two separator sheets 130 represents a "reference electrolytic capacitor."

Embodiment 2

Figure 13:
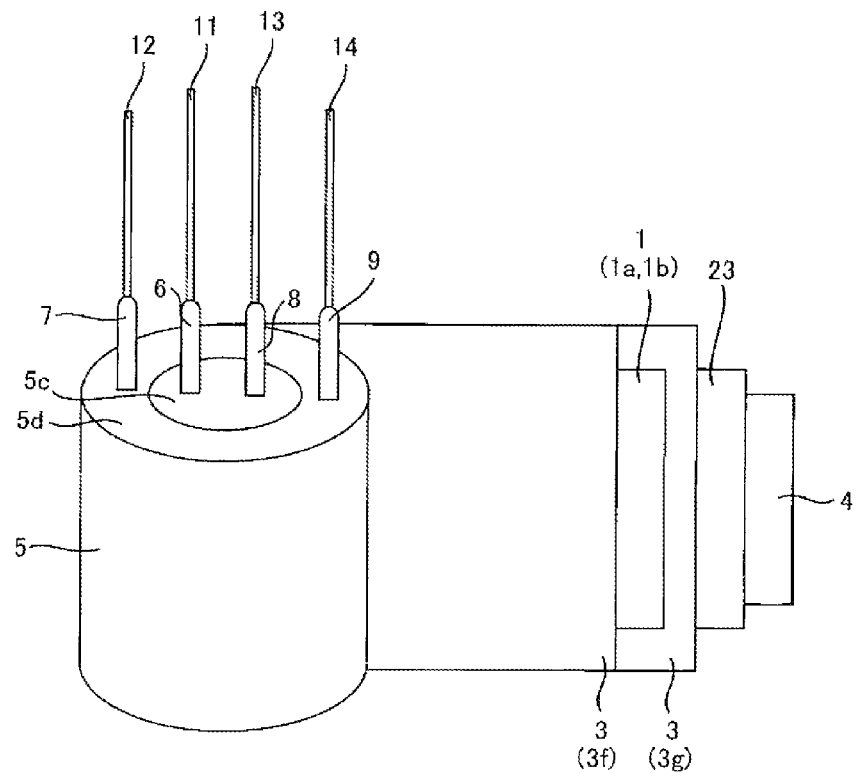
FIG. 13 is a perspective view showing a structure of an electrolytic capacitor in accordance with Embodiment 2.

FIG. 13 is a perspective view showing a structure of an electrolytic capacitor in accordance with Embodiment 2. Referring to FIG. 13, an electrolytic capacitor 20 in accordance with Embodiment 2 is formed by replacing two cathode foils 2a and 2b of electrolytic capacitor 10A shown in FIGS. 8 and 10 by one cathode foil 23, and except for this point, it is the same as electrolytic capacitor 10A. Therefore, electrolytic capacitor 20 also includes two capacitor elements 5c and 5d arranged at different positions along the radial direction. In electrolytic capacitor 20, resin seal may be used in place of rubber packing 16. Further, resin seal may be used not only in electrolytic capacitor 20 but also in electrolytic capacitors 10, 10A and 10B.

Figure 14:
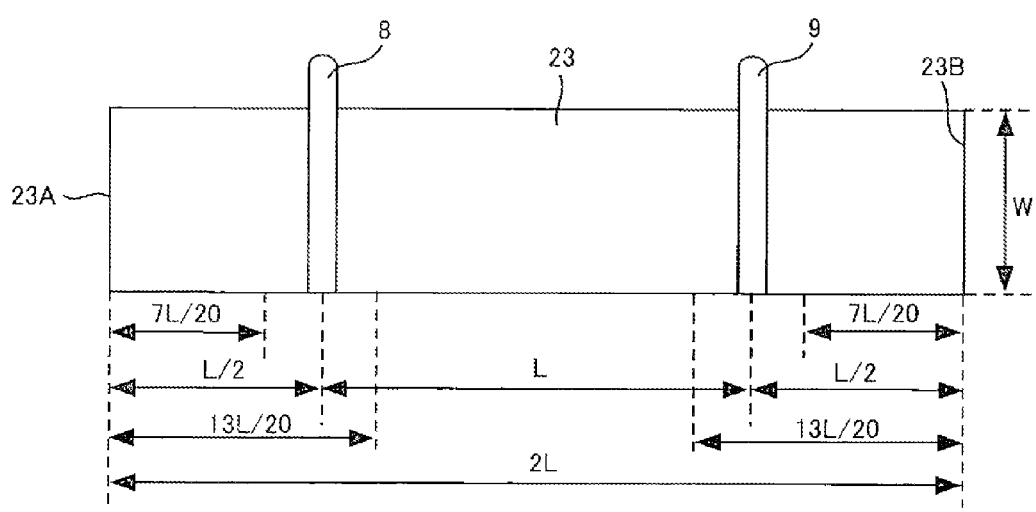
FIG. 14 is a plan view of the cathode foil shown in FIG. 13.

FIG. 14 is a plan view of a cathode foil 23 shown in FIG. 13. Referring to FIG. 14, cathode foil 23 has the length 2L and the width W. Lead tab terminal 8 is connected to cathode foil 23 at a position of a distance L/2 from one end 23A of cathode foil 23, and lead tab terminal 9 is connected to cathode foil 23 at a position of a distance L/2 from the other end 23B of cathode foil 23. As a result, the distance between lead tab terminals 8 and 9 is L.

Figure 15:
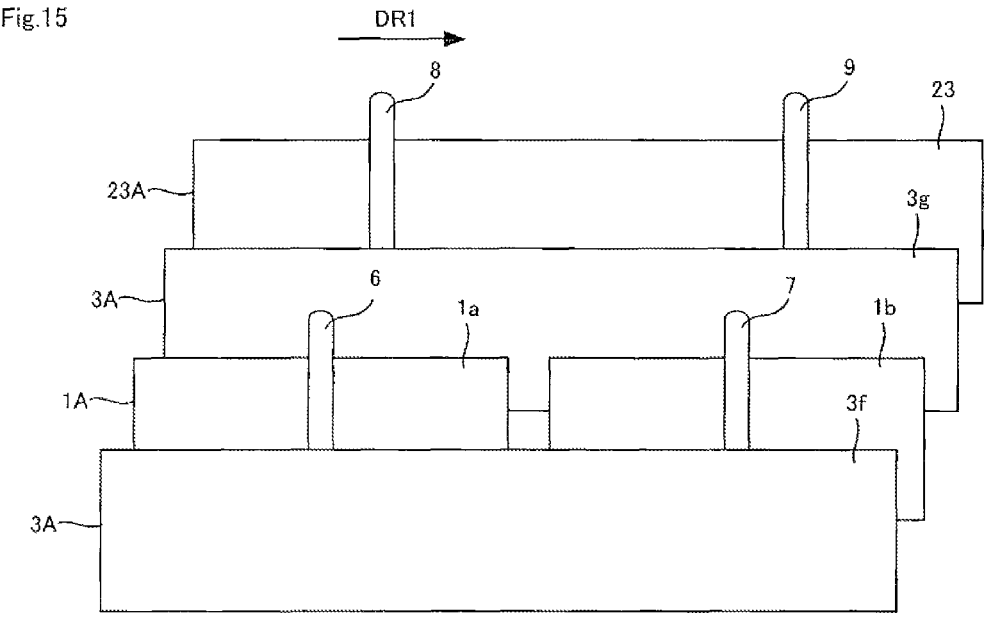
FIG. 15 is a perspective view showing the method of arranging the chemically processed anode foils, cathode foil and separator sheets when the electrolytic capacitor shown in FIG. 13 is fabricated.

FIG. 15 is a perspective view showing the method of arranging chemically processed anode foils 1a, 1b, cathode foil 23 and separator sheets 3f and 3g when electrolytic capacitor 20 shown in FIG. 13 is fabricated. Referring to FIG. 15, two chemically processed anode foils 1a and 1b are arranged continuously between separator sheets 3f and 3g. Here, two chemically processed anode foils 1a and 1b are arranged spaced by a prescribed distance to be electrically insulated from each other. Further, cathode foil 23 is arranged to be opposite to chemically processed anode foils 1a and 1b with separator sheet 3g interposed.

Two chemically processed anode foils 1a and 1b, one cathode foil 23 and two separator sheets 3f and 3g are arranged in the manner as shown in FIG. 15, and two chemically processed anode foils 1a and 1b, one cathode foil 23 and two separator sheets 3f and 3g are rolled from rolling start ends 1A, 23A and 3A in the direction of rolling DR1, whereby capacitor element 5 including two capacitor elements 5c and 5d is formed. At the point where chemically processed anode foil 1a, cathode foil 23 of the length L and separator sheets 3f and 3g of the length L are rolled, capacitor element 5c is formed, and at the point where chemically processed anode foil 1b, cathode foil 23 of the remaining length L and separator sheets 3f and 3g of the remaining length L are rolled, capacitor element 5d is formed.

Thus, capacitor element 5c is arranged on the inner circumferential side, and capacitor element 5d is arranged on the outer circumferential side.

In fabricating electrolytic capacitor 20, it is unnecessary that two chemically processed anode foils 1a and 1b, one cathode foil 23 and two separator sheets 3f and 3g are rolled from the rolling start ends 1A, 23A and 3A, and two chemically processed anode foils 1a and 1b, one cathode foil 23 and two separator sheets 3f and 3g may be rolled from the central portion of two separator sheets 3f and 3g. Dependent on the manner of rolling two chemically processed anode foils 1a and 1b, one cathode foil 23 and two separator sheets 3f and 3g, lead tab terminals 6 to 9 come to be arranged in a rectangle as shown in FIG. 1 or arranged linearly as shown in FIG. 13.

After forming capacitor element 5 by rolling two chemically processed anode foils 1a and 1b, one cathode foil 23 and two separator sheets 3f and 3g, electrolytic capacitor 20 is fabricated by the same method as that of fabricating electrolytic capacitor 10. In fabricating electrolytic capacitor 20, by using resin seal in place of rubber packing 16, production yield (throughput) can be improved, as the resin seal is easier to manufacture than rubber packing.

In electrolytic capacitor 20, each of capacitor elements 5c and 5d is formed by the chemically processed anode foil and the cathode foil having the length L and width W, and hence, it has the capacitance C. Capacitor element 5 has the same effect as attained by two capacitor elements 5c and 5d connected in parallel, and therefore, its capacitance is 2C=(C0), which is the same as that of the conventional aluminum rolled solid electrolytic capacitor 100.

Therefore, even though electrolytic capacitor 20 is fabricated using chemically processed anode foil 1 having one-half the length of the conventional chemically formed anode 110 and cathode foil 23 having the same length as the conventional cathode foil 120, its capacitance is not smaller than that of conventional aluminum rolled solid electrolytic capacitor 100, while its equivalent series resistance becomes one-half that of conventional aluminum rolled solid electrolytic capacitor 100.

Further, electrolytic capacitor 20 is fabricated by dividing conventional chemically processed anode foil 110 into two chemically processed anode foils 1a and 1b arranged continuously in the direction of rolling DR1, and therefore, the diameter after rolling is approximately the same as that of conventional aluminum rolled solid electrolytic capacitor 100. Specifically, electrolytic capacitor 20 having reduced equivalent series resistance can be fabricated while the capacitance is maintained and the size is not made larger than that of conventional aluminum rolled solid electrolytic capacitor 100.

As described above, by using one cathode foil 23 and two chemically processed anode foils 1a and 1b, electrolytic capacitor 20 having the same effect as attained by two capacitor elements 5c and 5d connected in parallel can be fabricated.

Table 2 shows, in comparison, electric characteristics of electrolytic capacitor 20 in accordance with Embodiment 2 and the conventional electrolytic capacitor.

TABLE 2

|  | Cathode foil | Sealing material | Capacitance (μF) | tanδ (%) | ESR (mΩ) | Leakage current (μA) |
| --- | --- | --- | --- | --- | --- | --- |
| Conventional Example 1 | Aluminum foil | Rubber | 565 | 2.5 | 5.5 | 11 |
| Example 1 | Aluminum foil | Rubber | 567 | 2.3 | 2.7 | 12 |
| Example 2 | Aluminum foil | Resin | 562 | 2.5 | 2.7 | 18 |
| Conventional Example 2 | Aluminum nitride film | Rubber | 1520 | 1.8 | 7.0 | 13 |
| Example 3 | Aluminum nitride film | Rubber | 1532 | 1.7 | 3.4 | 11 |
| Example 4 | Aluminum nitride film | Resin | 1539 | 1.7 | 3.4 | 19 |

Referring to Table 2, Conventional Examples 1 and 2 represent electrolytic capacitors consisting of only one capacitor element 150 fabricated by using chemically processed anode foil 110 and cathode foil 120 having the length L, and Example 1 represents electrolytic capacitor 20 fabricated by using two chemically processed anode foils 1a and 1b, one cathode foil 23 and rubber packing 16.

Example 2 represents electrolytic capacitor 20 fabricated by using resin seal in place of rubber packing 16 of Example 1, and Example 3 represents electrolytic capacitor 20 fabricated by replacing cathode foil 23 of Example 1 by aluminum foil having a titanium aluminum nitride film formed thereon and using two chemically processed anode foil 1a and 1b and one cathode foil 23, and Example 4 represent electrolytic capacitor 20 fabricated by replacing rubber packing 16 of Example 3 by resin seal.

Capacitance and dielectric tangent (tan δ) were measured at 120 Hz, equivalent series resistance ESR was measured at 100 kHz, and leakage current LC is a value when rated voltage was applied for two minutes.

The titanium aluminum nitride film was formed by vapor deposition on the surface of aluminum foil. Values of capacitance, dielectric tangent (tan δ) and equivalent series resistance ESR shown in Table 2 are average values among 30 samples.

From the results shown in Table 2, the capacitance and dielectric tangent (tan δ) of electrolytic capacitor 20 in accordance with Embodiment 2 are approximately the same as those of Conventional Examples 1 and 2. It is noted that equivalent series resistance ESR of electrolytic capacitor 20 in accordance with Embodiment 2 is reduced to about one-half that of Conventional Examples 1 and 2 (see Examples 1 to 4). Further, equivalent series resistance ESR does not vary when rubber packing 16 is replaced by resin seal.

It is confirmed through experiment that even when only one cathode foil is used, the equivalent series resistance can be reduced to approximately one-half while the capacitor capacitance is maintained, by increasing the number of chemically processed anode foils to two. Further, it is also confirmed through experiment that the equivalent series resistance does not vary even when resin seal is used.

Figure 16:
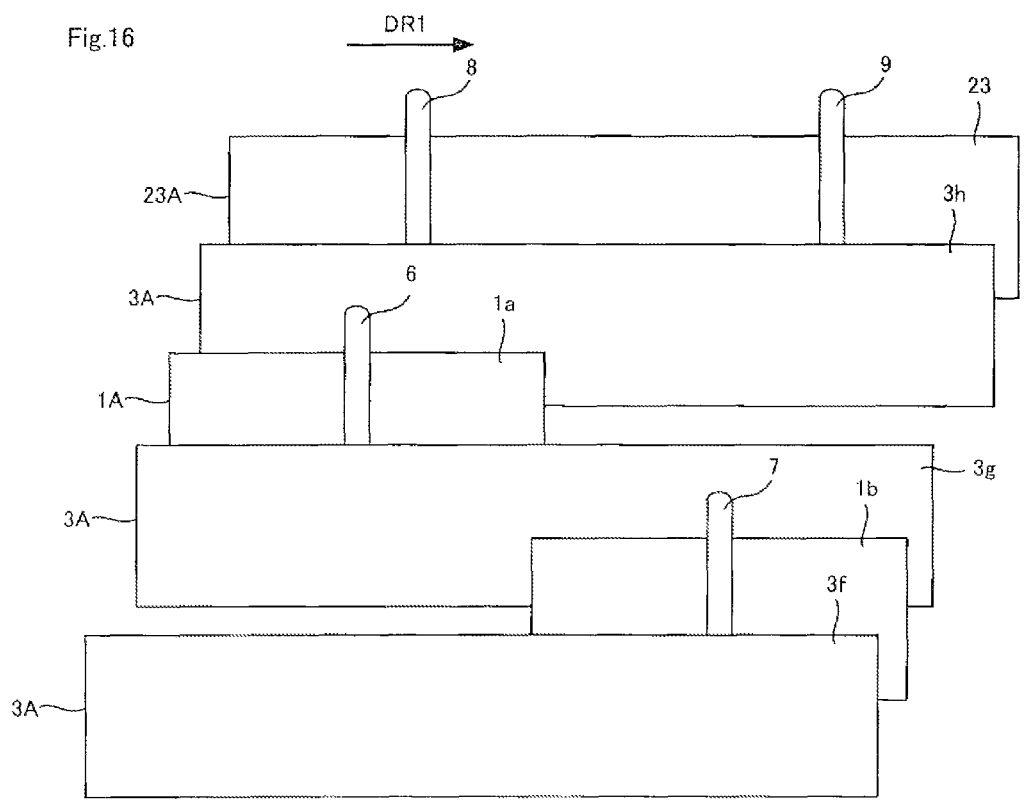
FIG. 16 is a perspective view showing another method of arranging the chemically processed anode foils, cathode foil and separator sheets when the electrolytic capacitor shown in FIG. 13 is fabricated by using two chemically processed anode foils and one cathode foil.

FIG. 16 is a perspective view showing another method of arranging the chemically processed anode foils, cathode foil and separator sheets when the electrolytic capacitor shown in FIG. 13 is fabricated by using two chemically processed anode foils and one cathode foil. Referring to FIG. 16, when electrolytic capacitor 20 shown in FIG. 13 is formed by using two chemically processed anode foils and one cathode foil, electrolytic capacitor 20 includes a separator sheet 3h in addition to two separator sheets 3f and 3g.

Separator sheets 3f and 3g may be shorter than separator sheet 3h, as long as they are longer than chemically processed anode foils 1a and 1b. Chemically processed anode foil 1a is arranged between separator sheets 3g and 3h, while chemically processed anode foil 1b is arranged between separator sheets 3f and 3g. Here, chemically processed anode foil 1b is arranged continuous to chemically processed anode foil 1a in the direction of rolling DR1. Cathode foil 23 is arranged to be opposite to chemically processed anode foil 1a with separator sheet 3h interposed, and opposite to chemically processed anode foil 1b with separator sheets 3g and 3h interposed.

Two chemically processed anode foils 1a and 1b, one cathode foil 23 and three separator sheets 3f, 3g and 3h are arranged in the manner as shown in FIG. 16, and two chemically processed anode foils 1a and 1b, one cathode foil 23 and three separator sheets 3f, 3g and 3h are rolled from rolling start ends 1A, 23A and 3A in the direction of rolling DR1, so that capacitor element 5 including two capacitor elements 5c and 5d is formed. At the point where chemically processed anode foil 1a, cathode foil 23 of the length L and separator sheets 3f, 3g and 3h of the length L are rolled, capacitor element 5c is formed, and at the point where chemically processed anode foil 1b, cathode foil 23 of the remaining length L and separator sheets 3f, 3g and 3h of the remaining length L are rolled, capacitor element 5d is formed.

Therefore, capacitor element 5c is arranged on the inner circumferential side, and capacitor element 5d is arranged on the outer circumferential side.

After forming capacitor element 5 by rolling two chemically processed anode foils 1a and 1b, one cathode foil 23 and three separator sheets 3f, 3g and 3h, electrolytic capacitor 20 is fabricated by the same method as that of fabricating electrolytic capacitor 10.

Electrolytic capacitor 20 fabricated by using two chemically processed anode foils 1a and 1b, one cathode foil 23 and three separator sheets 3f, 3g and 3h includes, in addition to the example fabricated by using two chemically processed anode foils 1a and 1b, one cathode foil 23 and two separator sheets 3f and 3g, only one additional separator sheet 3h. Therefore, the diameter after rolling is approximately the same as that of conventional aluminum rolled solid electrolytic capacitor 100.

When electrolytic capacitor 20 is fabricated using two chemically processed anode foils 1a and 1b, one cathode foil 23 and three separator sheets 3f, 3g and 3h, chemically processed anode foil 1a may be arranged between separator sheets 3f and 3g, and chemically processed anode foil 1b may be arranged between separator sheets 3g and 3h, in FIG. 16.

Figure 17:
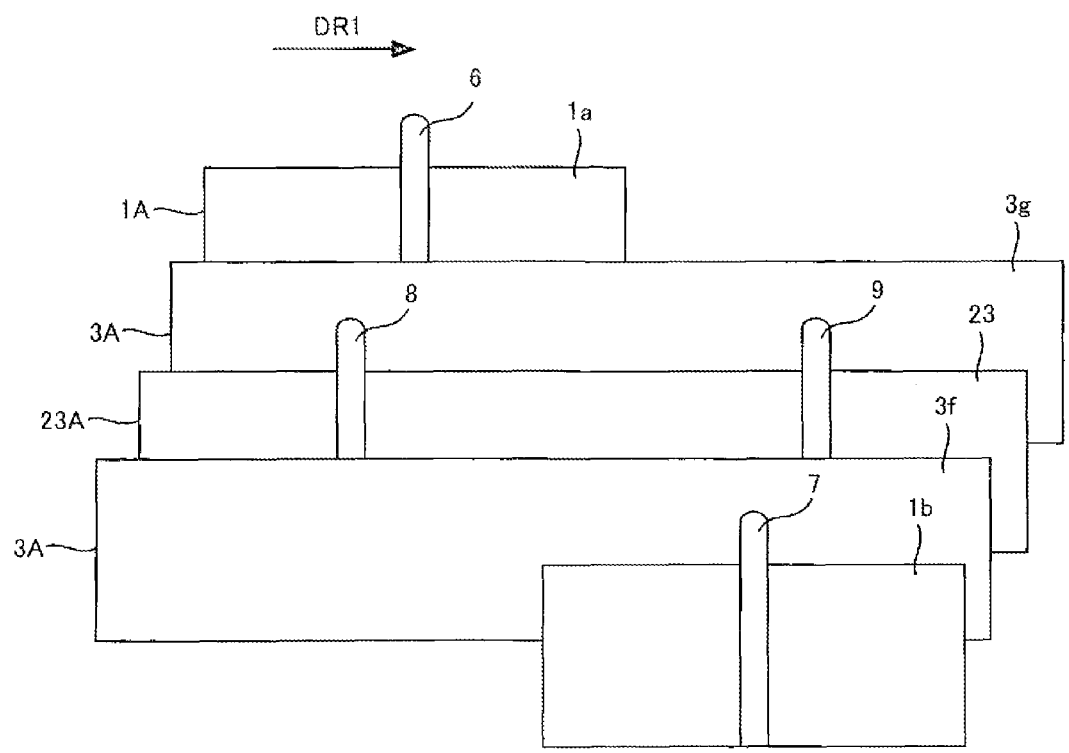
FIG. 17 is a perspective view showing a still another method of arranging the chemically processed anode foils, cathode foil and separator sheets when the electrolytic capacitor shown in FIG. 13 is fabricated by using two chemically processed anode foils and one cathode foil.

FIG. 17 is a perspective view showing a still another method of arranging the chemically processed anode foils, cathode foil and separator sheets when the electrolytic capacitor shown in FIG. 13 is fabricated by using two chemically processed anode foils and one cathode foil.

Referring to FIG. 17, cathode foil 23 is arranged between separator sheets 3f and 3g. Chemically processed anode foil 1a is arranged to be opposite to cathode foil 23 with separator sheet 3g interposed, and chemically processed anode foil 1b is arranged to be opposite to cathode foil 23 with separator sheet 3f interposed. Here, chemically processed anode foil 1b is arranged continuous to chemically processed anode foil 1a in the direction of rolling DR1.

Two chemically processed anode foils 1a and 1b, one cathode foil 23 and two separator sheets 3f and 3g are arranged in the manner as shown in FIG. 17, and two chemically processed anode foils 1a and 1b, one cathode foil 23 and two separator sheets 3f and 3g are rolled from rolling start ends 1A, 23A and 3A in the direction of rolling DR1, so that capacitor element 5 including two capacitor elements 5c and 5d is formed. At the point where chemically processed anode foil 1a, cathode foil 23 of the length L and separator sheets 3f and 3g of the length L are rolled, capacitor element 5c is formed, and at the point where chemically processed anode foil 1b, cathode foil 23 of the remaining length L and separator sheets 3f and 3g of the remaining length L are rolled, capacitor element 5d is formed.

Therefore, capacitor element 5c is arranged on the inner circumferential side, and capacitor element 5d is arranged on the outer circumferential side.

After forming capacitor element 5 by rolling two chemically processed anode foils 1a and 1b, one cathode foil 23 and two separator sheets 3f and 3g, electrolytic capacitor 20 is fabricated by the same method as that of fabricating electrolytic capacitor 10.

In fabricating electrolytic capacitor 20, it is unnecessary that two chemically processed anode foils 1a and 1b, one cathode foil 23 and two separator sheets 3f and 3g are rolled from the rolling start ends 1A, 23A and 3A, and two chemically processed anode foils 1a and 1b, one cathode foil 23 and two separator sheets 3f and 3g may be rolled from the central portion of two separator sheets 3f and 3g. Dependent on the manner of rolling two chemically processed anode foils 1a and 1b, one cathode foil 23 and two separator sheets 3f and 3g, lead tab terminals 6 to 9 come to be arranged in a rectangle as shown in FIG. 1 or arranged linearly as shown in FIG. 13.

Further, when electrolytic capacitor 20 is fabricated by using two chemically processed anode foils 1a and 1b, one cathode foil 23 and two separator sheets 3f and 3g, chemically processed anode foil 1a may be arranged to be opposite to cathode foil 23 with separator sheet 3f interposed, and chemically processed anode foil 1b may be arranged to be opposite to cathode foil 23 with separator sheet 3g interposed, in FIG. 17.

Figure 18:
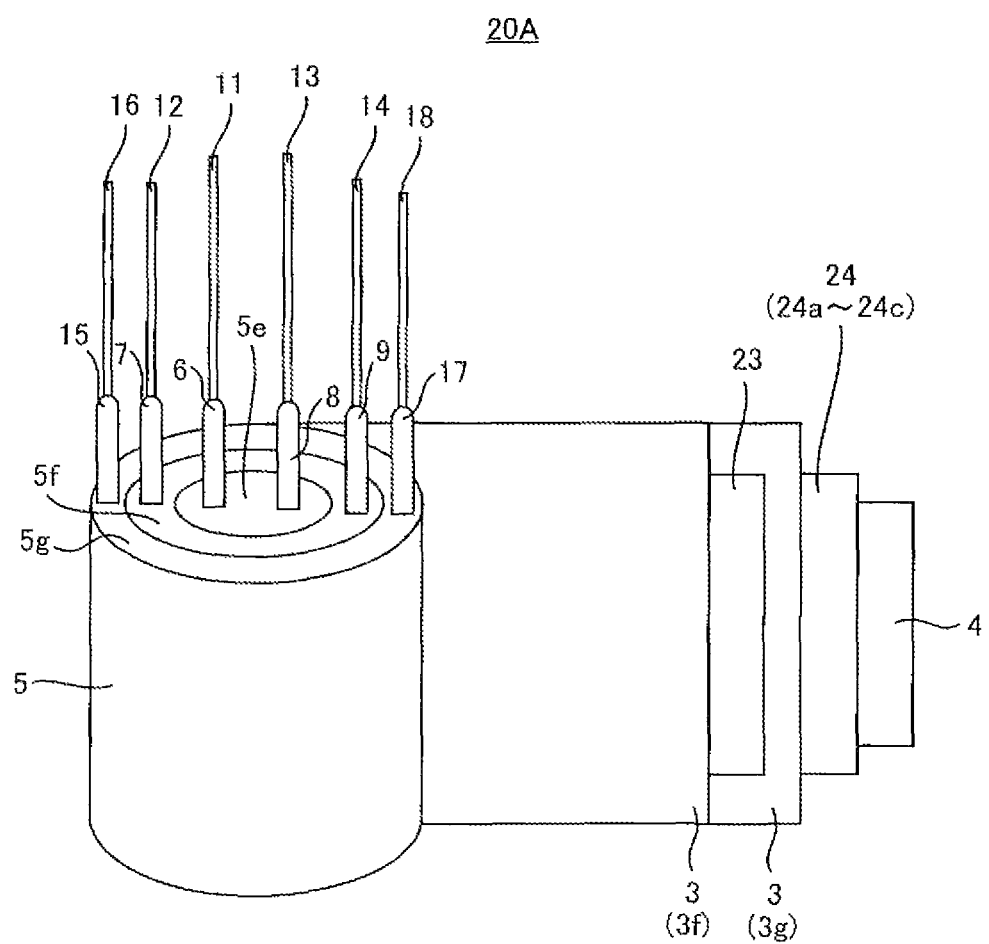
FIG. 18 is another perspective view showing the structure of the electrolytic capacitor in accordance with Embodiment 2.

FIG. 18 is another perspective view showing the structure of the electrolytic capacitor in accordance with Embodiment 2. The electrolytic capacitor in accordance with Embodiment 2 may be an electrolytic capacitor 20A shown in FIG. 18. Referring to FIG. 18, electrolytic capacitor 20A is formed by replacing chemically processed anode foils 1a and 1b of electrolytic capacitor 20 shown in FIGS. 13 and 15 by chemically processed anode foils 24a, 24b and 24c, and by adding lead tab terminals 15 and 17, an anode lead 16 and a cathode lead 18, and except for these points, it is the same as electrolytic capacitor 20. It is also possible in electrolytic capacitor 20A to use resin seal in place of rubber packing 16.

In electrolytic capacitor 20A, capacitor element 5 includes capacitor elements 5e, 5f and 5g. Capacitor element 5e is arranged on the innermost circumferential side, capacitor element 5f is arranged on the outer side of capacitor element 5e, and capacitor element 5g is arranged on the outermost circumferential side.

Figure 19:
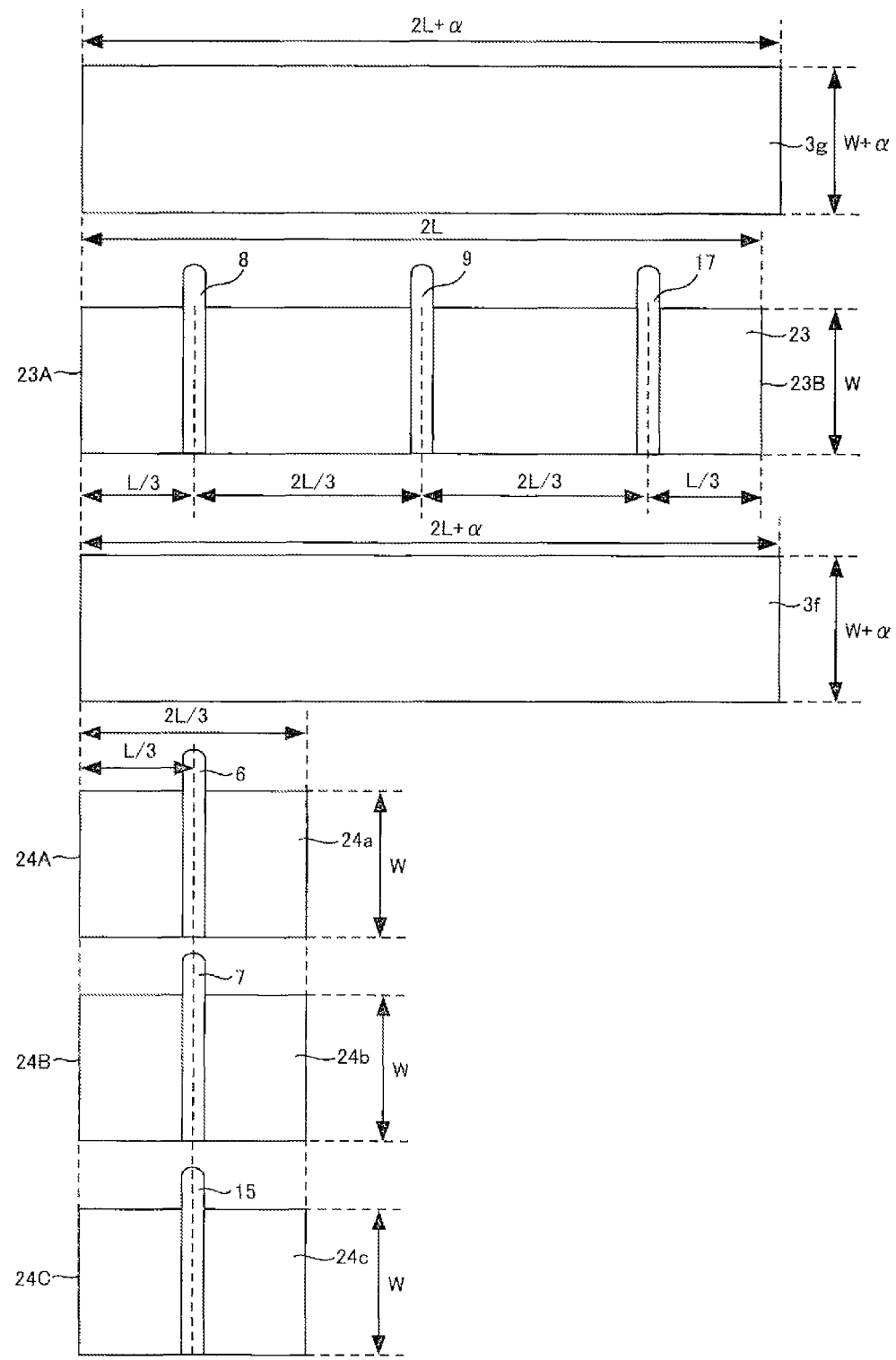
FIG. 19 is a plan view of the chemically processed anode foils, the cathode foil and the separator sheets forming the electrolytic capacitor shown in FIG. 18.

FIG. 19 is a plan view of chemically processed anode foils 24a to 24c, cathode foil 23 and the separator sheets 3f and 3g forming electrolytic capacitor 20A shown in FIG. 18. Referring to FIG. 19, in electrolytic capacitor 20A, lead tab terminal 8 is connected to cathode foil 23 at a position of the distance L/3 from one end 23A of cathode foil 23, lead tab terminal 17 is connected to cathode foil 23 at a position of the distance L/3 from the other end 23B of cathode foil 23, and lead tab terminal 9 is connected to cathode foil 23 at a position of the distance 2L/3 from each of lead tab terminals 8 and 17.

Chemically processed anode foil 24 includes three chemically processed anode foils 24a, 24b and 24c. Each of the three chemically processed anode foils 24a, 24b and 24c is formed of aluminum foil having its surface chemically processed. Each of the three chemically processed anode foils 24a, 24b and 24c has the length of 2L/3 and the width W. Lead tab terminal 6 is connected to chemically processed anode foil 24a at a position of the distance L/3 from one end 24A of chemically processed anode foil 24a, lead tab terminal 7 is connected to chemically processed anode foil 24b at a position of the distance L/3 from one end 24B of chemically processed anode foil 24b, and lead tab terminal 15 is connected to chemically processed anode foil 24c at a position of the distance L/3 from one end 24C of chemically processed anode foil 24c.

In electrolytic capacitor 20A, capacitor element 5e consists of chemically processed anode foil 24a, cathode foil 23 and separator sheets 3f and 3g, capacitor element 5f consists of chemically processed anode foil 24b, cathode foil 23 and separator sheets 3f and 3g, and capacitor element 5g consists of chemically processed anode foil 24c, cathode foil 23 and separator sheets 3f and 3g.

Figure 20:
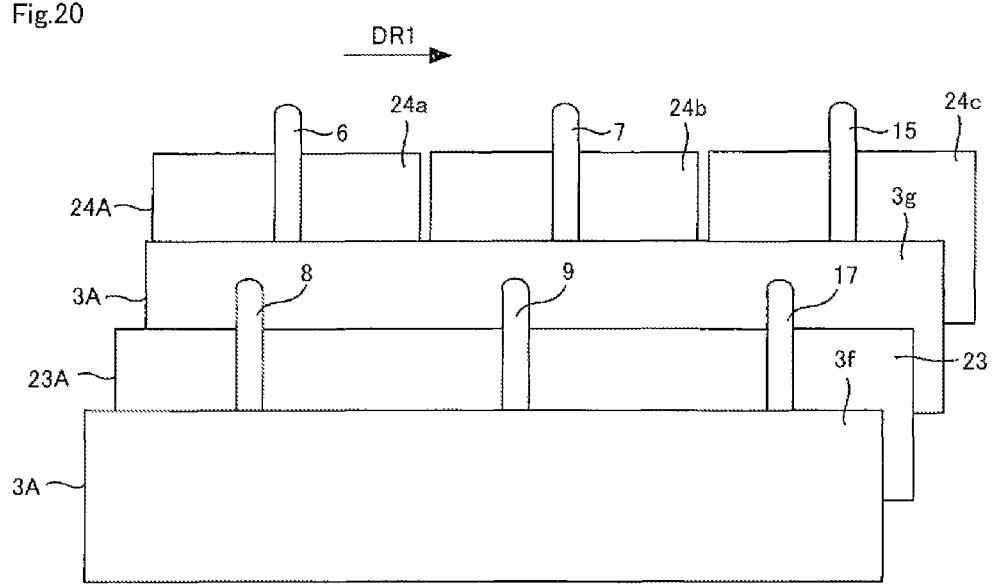
FIG. 20 is a perspective view showing a method of arranging the chemically processed anode foils, cathode foil and separator sheets when the electrolytic capacitor shown in FIG. 18 is fabricated.

FIG. 20 is a perspective view showing a method of arranging chemically processed anode foils 24a, 24b and 24c, cathode foil 23 and separator sheets 3f and 3g when electrolytic capacitor 20A shown in FIG. 18 is fabricated. Referring to FIG. 20, cathode foil 23 is arranged between separator sheets 3f and 3g. Three chemically processed anode foils 24a, 24b and 24c are arranged to be opposite to cathode foil 23 with separator sheet 3g interposed. Specifically, three chemically processed anode foils 24a, 24b and 24c are arranged continuously in the direction of rolling DR1. Here, three chemically processed anode foils 24a, 24b and 24c are arranged spaced by a prescribed distance to be electrically insulated from each other.

Three chemically processed anode foils 24a, 24b and 24c, one cathode foil 23 and two separator sheets 3f and 3g are arranged in the manner as shown in FIG. 20, and three chemically processed anode foils 24a, 24b and 24c, one cathode foil 23 and two separator sheets 3f and 3g are rolled form rolling start ends 3A, 23A and 24A in the direction of rolling DR1, so that capacitor element 5 including three capacitor elements 5e, 5f and 5g is formed. At the point where chemically processed anode foil 24a, cathode foil 23 of the length 2L/3 and separator sheets 3f and 3g of the length 2L/3 are rolled, capacitor element 5e is formed, at the point where chemically processed anode foil 24b, cathode foil 23 of the length 2L13 and separator sheets 3f and 3g of the length 2L/3 are rolled, capacitor element 5f is formed, and at the point where chemically processed anode foil 24c, cathode foil 23 of the remaining length 2L/3 and separator sheets 3f and 3g of the remaining length 2L/3 are rolled, capacitor element 5g is formed.

Therefore, capacitor element 5e is arranged on the innermost circumferential side, capacitor element 5f is arranged on the outer side of capacitor element 5e, and capacitor element 5g is arranged on the outermost circumferential side.

After forming capacitor element 5 by rolling three chemically processed anode foils 24a, 24b and 24c, one cathode foil 23 and two separator sheets 3f and 3g, electrolytic capacitor 20A is fabricated by the same method as that of fabricating electrolytic capacitor 10. When resin seal is used in place of rubber packing 16 for fabricating electrolytic capacitor 20A, production yield (throughput) can be improved, as resin seal can be manufactured more easily than rubber packing 16.

In electrolytic capacitor 20A, each of capacitor elements 5e, 5f and 5g is formed by the chemically processed anode foil and the cathode foil having the length 2L/3 and the width W, and therefore, it has the capacitance C1. Capacitor element 5 has the same effect as attained by three capacitor elements 5e, 5f and 5g connected in parallel, and therefore, its capacitance is 3C1=(C0), which is the same as the capacitance C0 of the conventional aluminum rolled solid electrolytic capacitor 100.

Therefore, even though electrolytic capacitor 20A is fabricated using chemically processed anode foils 24a, 24b and 24c having one-third the length of the conventional chemically formed anode 110 and cathode foil 23 having the same length as the conventional cathode foil 120, its capacitance is not smaller than that of conventional aluminum rolled solid electrolytic capacitor 100, while its equivalent series resistance becomes one-third that of conventional aluminum rolled solid electrolytic capacitor 100.

Further, as electrolytic capacitor 20A is fabricated by dividing conventional chemically processed anode foil 110 into three chemically processed anode foils 24a, 24b and 24c arranged continuously in the direction of rolling DR1, the diameter after rolling is approximately the same as that of conventional aluminum rolled solid electrolytic capacitor 100. Specifically, electrolytic capacitor 20A having reduced equivalent series resistance can be fabricated while the capacitance is maintained and the size is not made larger than that of conventional aluminum rolled solid electrolytic capacitor 100.

In this manner, by using one cathode foil 23 and three chemically processed anode foils 24a, 24b and 24c, electrolytic capacitor 20A having the same effect as attained by three capacitor elements 5e, 5f and 5g connected in parallel can be fabricated.

Figure 21:
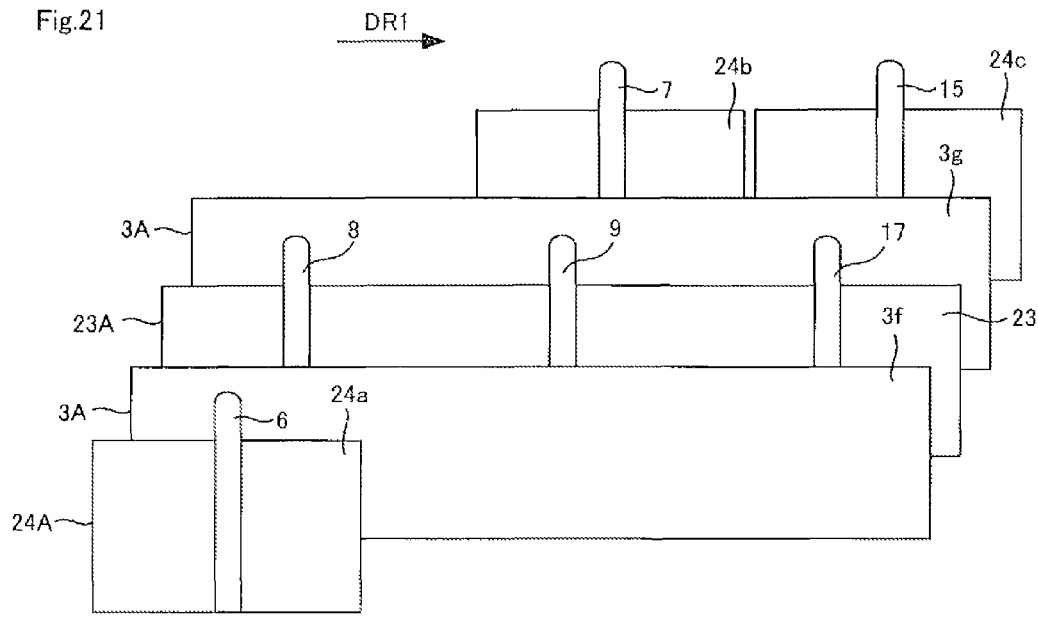
FIG. 21 is a perspective view showing a method of arranging the chemically processed anode foils, cathode foil and separator sheets when the electrolytic capacitor shown in FIG. 18 is fabricated by using three chemically processed anode foils and one cathode foil.

FIG. 21 is a perspective view showing a method of arranging the chemically processed anode foils 24a, 24b and 24c, cathode foil 23 and separator sheets 3f and 3g when electrolytic capacitor 20A shown in FIG. 18 is fabricated by using three chemically processed anode foils 24a, 24b and 24c and one cathode foil 23.

Referring to FIG. 21, among the three chemically processed anode foils 24a, 24b and 24c, chemically processed anode foil 24a is arranged to be opposite to cathode foil 23 with separator sheet 3f interposed. The manner of arranging chemically processed anode foils 24b and 24c, cathode foil 23 and separator sheets 3f and 3g is the same as that shown in FIG. 20. Here, three chemically processed anode foils 24a, 24b and 24c are arranged continuously in the direction of rolling DR1, and two chemically processed anode foils 24b and 24c are arranged spaced by a prescribed distance to be electrically insulated from each other.

Three chemically processed anode foils 24a, 24b and 24c, one cathode foil 23 and two separator sheets 3f and 3g are arranged in the manner as shown in FIG. 21, and three chemically processed anode foils 24a, 24b and 24c, one cathode foil 23 and two separator sheets 3f and 3g are rolled from rolling start ends 3A, 23A and 24A in the direction of rolling DR1, so that capacitor element 5 including three capacitor elements 5e, 5f and 5g is formed. At the point where chemically processed anode foil 24a, cathode foil 23 of the length 2L/3 and separator sheets 3f and 3g of the length 2L/3 are rolled, capacitor element 5e is formed, at the point where chemically processed anode foil 24b, cathode foil 23 of the length 2L/3 and separator sheets 3f and 3g of the length 2L/3 are rolled, capacitor element 5f is formed, and at the point where chemically processed anode foil 24c, cathode foil 23 of the remaining length 2L/3 and separator sheets 3f and 3g of the remaining length 2L/3 are rolled, capacitor element 5g is formed.

Therefore, capacitor element 5e is arranged on the innermost circumferential side, capacitor element 5f is arranged on the outer side of capacitor element 5e, and capacitor element 5g is arranged on the outermost circumferential side.

After forming capacitor element 5 by rolling three chemically processed anode foils 24a, 24b and 24c, one cathode foil 23 and two separator sheets 3f and 3g, electrolytic capacitor 20A is fabricated by the same method as that of fabricating electrolytic capacitor 10.

Though it has been described that among three chemically processed anode foils 24a, 24b and 24c, chemically processed anode foil 24a is arranged to be opposite to cathode foil 23 with separator sheet 3f interposed in the example of FIG. 21, the present invention is not limited thereto, and among three chemically processed anode foils 24a, 24b and 24c, chemically processed anode foil 24b or 24c may be arranged to be opposite to cathode foil 23 with separator sheet 3f interposed.

Figure 22:
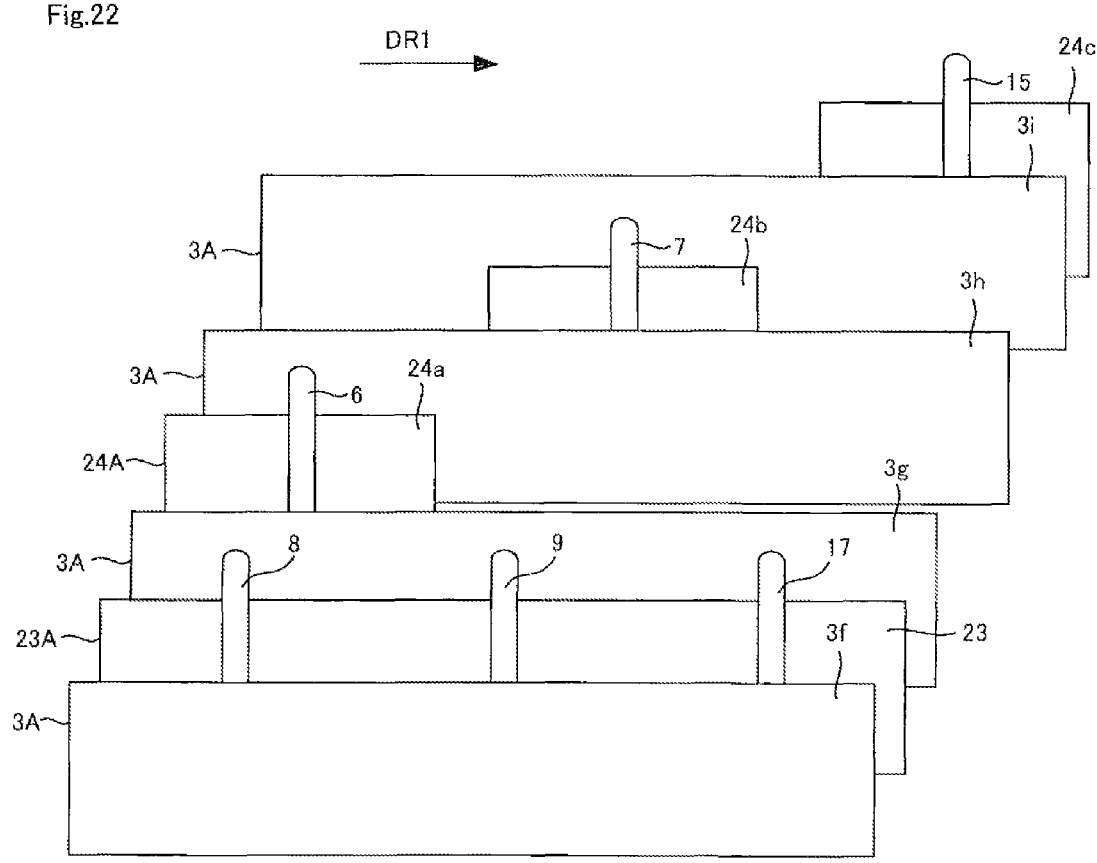
FIG. 22 is a perspective view showing another method of arranging the chemically processed anode foils, cathode foil and separator sheets when the electrolytic capacitor shown in FIG. 18 is fabricated by using three chemically processed anode foils and one cathode foil.

FIG. 22 is a perspective view showing another method of arranging chemically processed anode foils 24a, 24b and 24c, cathode foil 23 and the separator sheets when electrolytic capacitor 20A shown in FIG. 18 is fabricated by using three chemically processed anode foils 24a, 24b and 24c and one cathode foil 23.

Referring to FIG. 22, when electrolytic capacitor 20A shown in FIG. 18 is formed by using three chemically processed anode foils 24a, 24b and 24c and one cathode foil 23, electrolytic capacitor 20A includes separator sheets 3h and 3i in addition to two separator sheets 3f and 3g.

Each of separator sheets 3h and 3i has the same length and same width as separator sheets 3f and 3g. Chemically processed anode foil 24a is arranged between separator sheets 3g and 3h to be opposite to cathode foil 23 with separator sheet 3g interposed, chemically processed anode foil 24b is arranged between separator sheets 3h and 3i to be opposite to cathode foil 23 with separator sheets 3g and 3h interposed, and chemically processed anode foil 24c is arranged to be opposite to cathode foil 23 with separator sheets 3g, 3h and 3i interposed. In this case, chemically processed anode foils 24a, 24b and 24c are arranged continuously in the direction of rolling DR1.

Three chemically processed anode foils 24a, 24b and 24c, one cathode foil 23 and four separator sheets 3f, 3g, 3h and 3i are arranged in the manner as shown in FIG. 22, and three chemically processed anode foils 24a, 24b and 24c, one cathode foil 23 and four separator sheets 3f, 3g, 3h and 3i are rolled from rolling start ends 3A, 23A and 24A in the direction of rolling DR1, so that capacitor element 5 including three capacitor elements 5e, 5f and 5g is formed. At the point where chemically processed anode foil 24a, cathode foil 23 of the length 2L/3 and separator sheets 3f, 3g, 3h and 3i of the length 2L/3 are rolled, capacitor element 5e is formed, at the point where chemically processed anode foil 24b, cathode foil 23 of the length 2L/3 and separator sheets 3f, 3g, 3h and 3i of the length 2L/3 are rolled, capacitor element 5f is formed, and at the point where chemically processed anode foil 24c, cathode foil 23 of the remaining length 2L/3 and separator sheets 3f, 3g, 3h and 3i of the remaining length 2L/3 are rolled, capacitor element 5g is formed.

Therefore, capacitor element 5e is arranged on the innermost circumferential side, capacitor element 5f is arranged on the outer side of capacitor element 5e, and capacitor element 5g is arranged on the outermost circumferential side.

After forming capacitor element 5 by rolling three chemically processed anode foils 24a, 24b and 24c, one cathode foil 23 and four separator sheets 3f, 3g, 3h and 3i, electrolytic capacitor 20A is fabricated by the same method as that of fabricating electrolytic capacitor 10.

Figure 23:
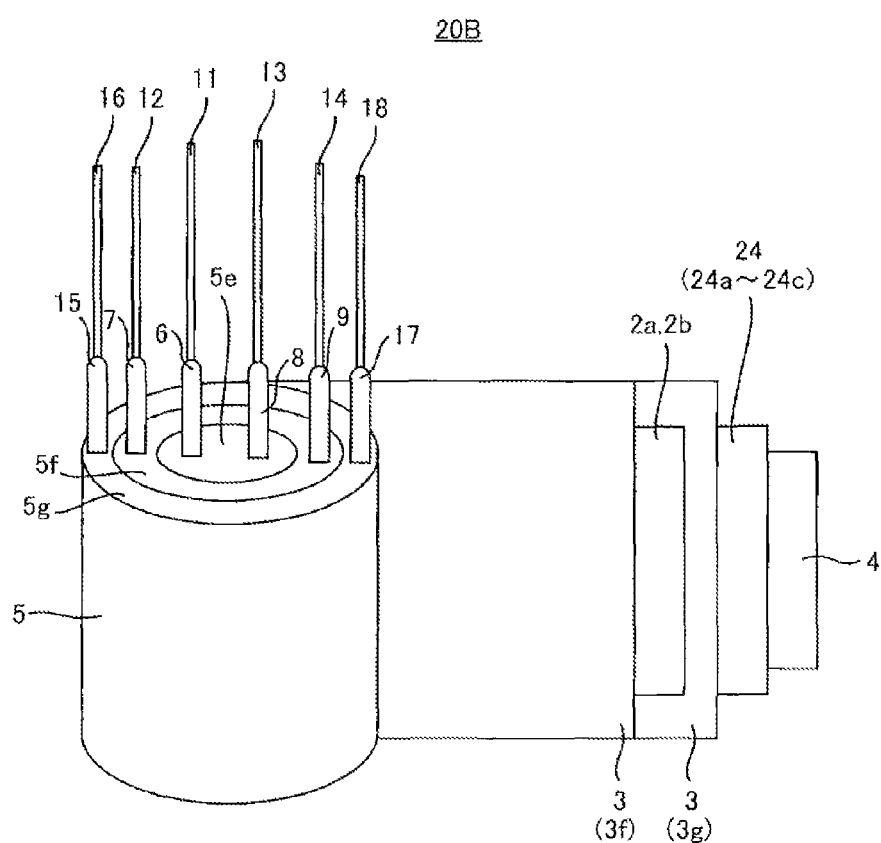
FIG. 23 is a still further perspective view showing the structure of the electrolytic capacitor in accordance with Embodiment 2.

FIG. 23 is a still further perspective view showing the structure of the electrolytic capacitor in accordance with Embodiment 2. The electrolytic capacitor in accordance with Embodiment 2 may be an electrolytic capacitor 20B shown in FIG. 23.

Referring to FIG. 23, electrolytic capacitor 20B is formed by replacing cathode foil 23 of electrolytic capacitor 20A shown in FIG. 18 by cathode foils 2a and 2b, and except for this point, it is the same as electrolytic capacitor 20A. In electrolytic capacitor 20B, again, resin seal may be used in place of rubber packing 16.

Figure 24:
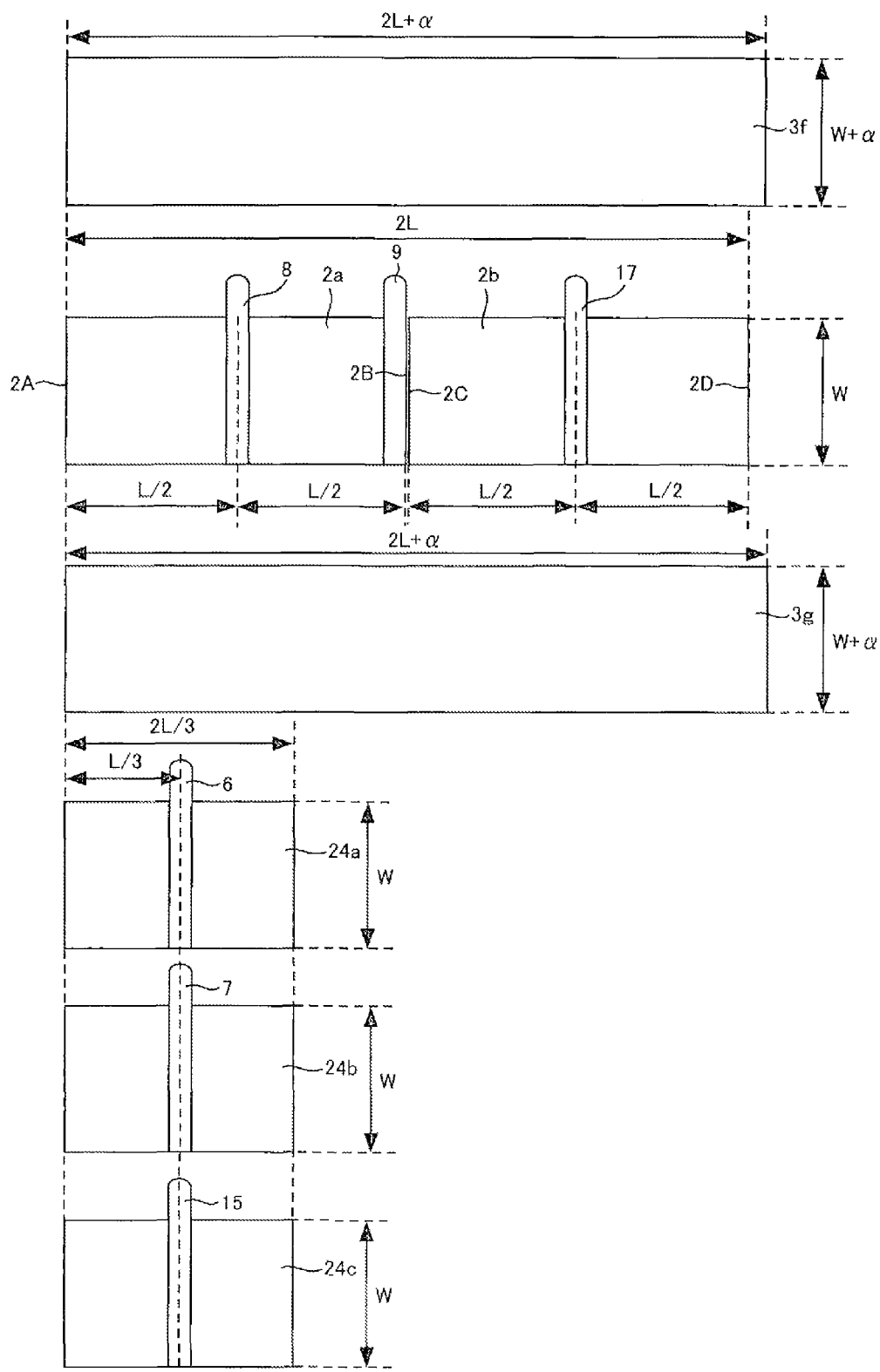
FIG. 24 is a plan view of the chemically processed anode foils, cathode foils and separator sheets forming the electrolytic capacitor shown in FIG. 23.

FIG. 24 is a plan view of chemically processed anode foils 24a to 24c, cathode foils 2a and 2b and separator sheets 3f and 3g forming the electrolytic capacitor shown in FIG. 23. Referring to FIG. 24, in electrolytic capacitor 20B, lead tab terminal 8 is connected to cathode foil 2a at a position of the distance L/2 from one end 2A of cathode foil 2a, lead tab terminal 9 is connected to the other end 2B of cathode foil 2a, and lead tab terminal 17 is connected to cathode foil 2b at a position of the distance L/2 from the other end 2D of cathode foil 2b.

In electrolytic capacitor 20B, capacitor element 5e consists of chemically processed anode foil 24a, cathode foil 2a and separator sheets 3f and 3g, capacitor element 5f consists of chemically processed anode foil 24b, cathode foils 2a and 2b and separator sheets 3f and 3g, and capacitor element 5g consists of chemically processed anode foil 24c, cathode foil 2b and separator sheets 3f and 3g.

Figure 25:
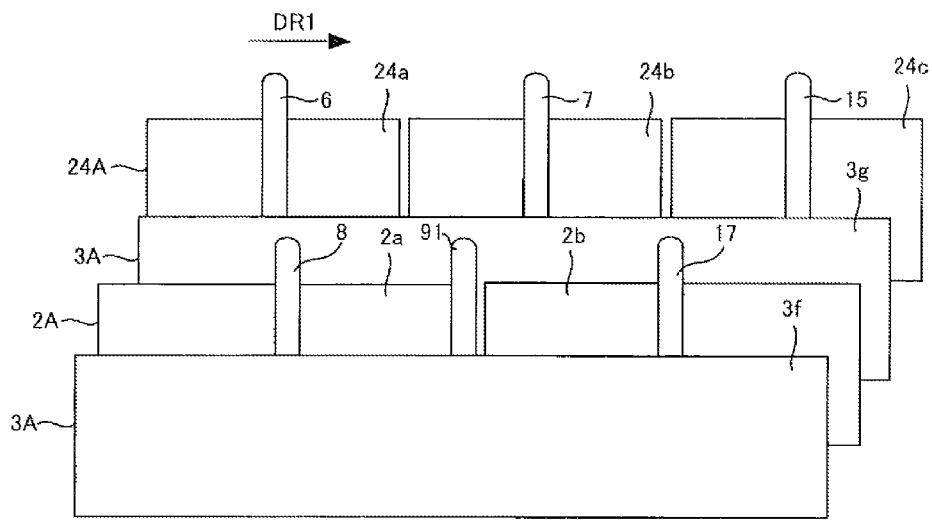
FIG. 25 is a perspective view showing a method of arranging the chemically processed anode foils, cathode foils and separator sheets when the electrolytic capacitor shown in FIG. 23 is fabricated.

FIG. 25 is a perspective view showing a method of arranging chemically processed anode foils 24a, 24b and 24c, cathode foils 2a and 2b and separator sheets 3f and 3g when the electrolytic capacitor 20B shown in FIG. 23 is fabricated.

Referring to FIG. 25, cathode foils 2a and 2b are arranged between separator sheets 3f and 3g. Three chemically processed anode foils 24a, 24b and 24c are arranged to be opposite to cathode foils 2a and 2b with separator sheet 3g interposed. Specifically, three chemically processed anode foils 24a, 24b and 24c are arranged continuously in the direction of rolling DR1. Here, three chemically processed anode foils 24a, 24b and 24c are arranged spaced by a prescribed distance to be electrically insulated from each other, and two cathode foils 2a and 2b are arranged spaced by a prescribed distance to be electrically insulated from each other.

Three chemically processed anode foils 24a, 24b and 24c, two cathode foils 2a and 2b, and two separator sheets 3f and 3g are arranged in the manner as shown in FIG. 25, and three chemically processed anode foils 24a, 24b and 24c, two cathode foils 2a and 2b, and two separator sheets 3f and 3g are rolled from rolling start ends 2A, 3A and 24A in the direction of rolling DR1, so that capacitor element 5 including three capacitor elements 5e, 5f and 5g is formed. At the point where chemically processed anode foil 24a, cathode foil 2a of the length 2L/3 and separator sheets 3f and 3g of the length 2L/3 are rolled, capacitor element 5e is formed, at the point where chemically processed anode foil 24b, cathode foil 2a of the length L/3, cathode foil 2b of the length L/3 and separator sheets 3f and 3g of the length 2L/3 are rolled, capacitor element 5f is formed, and at the point where chemically processed anode foil 24c, cathode foil 2b of the remaining length 2L/3 and separator sheets 3f and 3g of the remaining length 2L/3 are rolled, capacitor element 5g is formed.

Therefore, capacitor element 5e is arranged on the innermost circumferential side, capacitor element 5f is arranged on the outer side of capacitor element 5e, and capacitor element 5g is arranged on the outermost circumferential side.

After forming capacitor element 5 by rolling three chemically processed anode foils 24a, 24b and 24c, two cathode foils 2a and 2b and two separator sheets 3f and 3g, electrolytic capacitor 20B is fabricated by the same method as that of fabricating electrolytic capacitor 10. When resin seal is used in place of rubber packing 16 for fabricating electrolytic capacitor 20B, production yield (throughput) can be improved, as resin seal can be manufactured more easily than rubber packing 16.

In fabricating electrolytic capacitor 20B, it is unnecessary that three chemically processed anode foils 24a, 24b and 24c, two cathode foil 2a and 2b and two separator sheets 3f and 3g are rolled from the rolling start ends 2A, 3A and 24A, and three chemically processed anode foils 24a, 24b and 24c, two cathode foil 2a and 2b and two separator sheets 3f and 3g may be rolled from the central portion of two separator sheets 3f and 3g. Dependent on the manner of rolling three chemically processed anode foils 24a, 24b and 24c, two cathode foil 2a and 2b and two separator sheets 3f and 3g, lead tab terminals 6 to 9, 15 and 17 come to be arranged linearly as shown in FIG. 23 or arranged in a different shape.

In electrolytic capacitor 20B, each of capacitor elements 5e, 5f and 5g is formed by the chemically processed anode foil and the cathode foil having the length 2L/3 and the width W, and therefore, it has the capacitance C1. Capacitor element 5 has the same effect as attained by three capacitor elements 5e, 5f and 5g connected in parallel, and therefore, its capacitance is 3C1=(C0), which is the same as the capacitance C0 of the conventional aluminum rolled solid electrolytic capacitor 100.

Therefore, even though electrolytic capacitor 20B is fabricated using chemically processed anode foils 24a, 24b and 24c having one-third the length of the conventional chemically formed anode 110 and cathode foils 2a and 2b having one-half the length of the conventional cathode foil 120, its capacitance is not smaller than that of conventional aluminum rolled solid electrolytic capacitor 100, while its equivalent series resistance becomes one-third that of conventional aluminum rolled solid electrolytic capacitor 100.

Further, as electrolytic capacitor 20B is fabricated by dividing conventional chemically processed anode foil 110 into three chemically processed anode foils 24a, 24b and 24c arranged continuously in the direction of rolling DR1 and dividing conventional cathode foil 120 into two cathode foils 2a and 2b arranged continuously in the direction of rolling DR1, the diameter after rolling is approximately the same as that of conventional aluminum rolled solid electrolytic capacitor 100. Specifically, electrolytic capacitor 20B having reduced equivalent series resistance can be fabricated while the capacitance is maintained and the size is not made larger than that of conventional aluminum rolled solid electrolytic capacitor 100.

In this manner, by using two cathode foils 2a and 2b and three chemically processed anode foils 24a, 24b and 24c, electrolytic capacitor 20B having the same effect as attained by three capacitor elements 5e, 5f and 5g connected in parallel can be fabricated.

Figure 26:
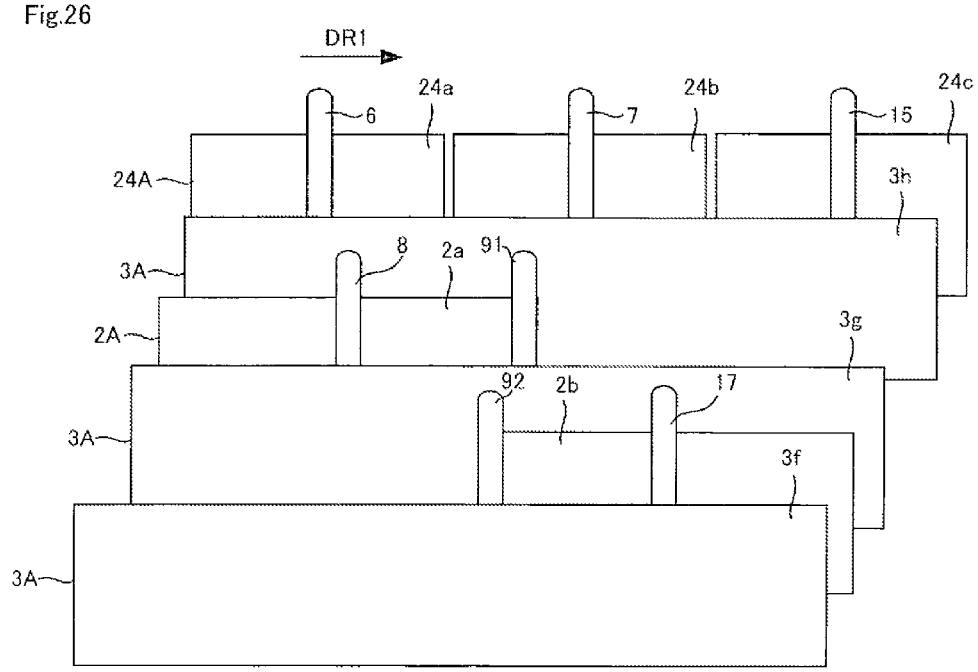
FIG. 26 is a perspective view showing a method of arranging the chemically processed anode foils, cathode foils and separator sheets when the electrolytic capacitor shown in FIG. 23 is fabricated by using three chemically processed anode foils and two cathode foils.
Figure 27:
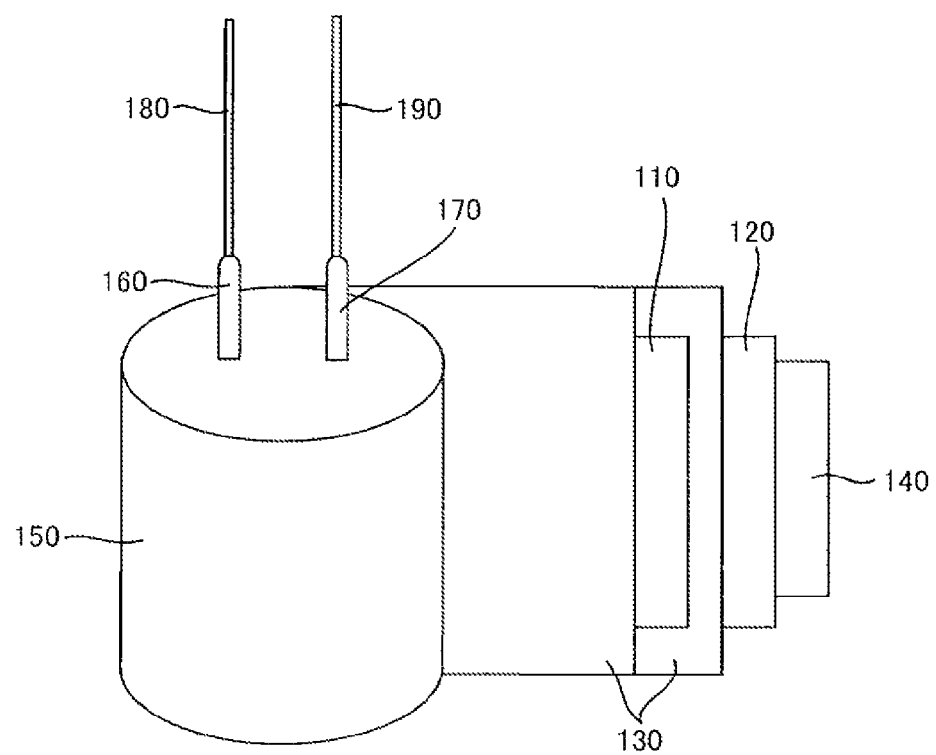
FIG. 27 is a perspective view showing a structure of a conventional aluminum rolled solid electrolytic capacitor.
Figure 28:
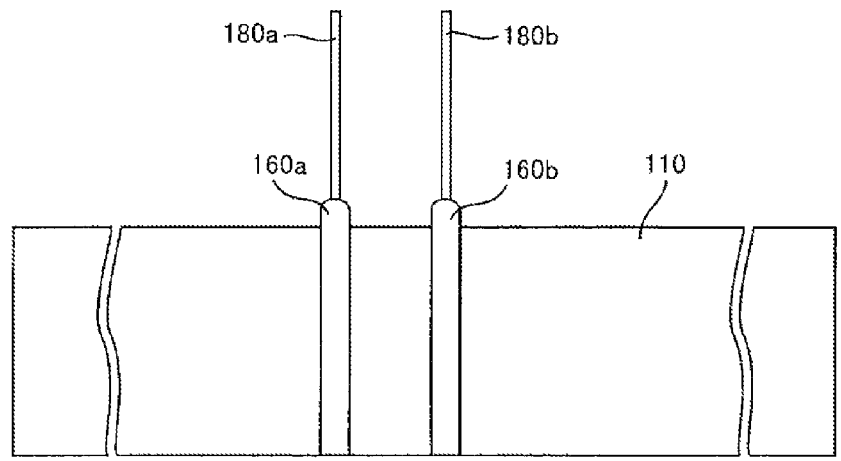
FIG. 28 is an illustration showing a method of connecting two anode leads and the chemically processed anode foil.
Figure 29:
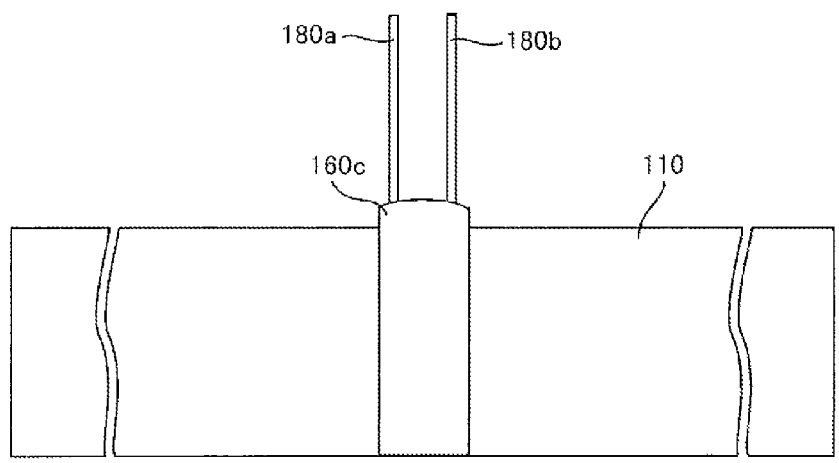
FIG. 29 is another illustration showing a method of connecting two anode leads and the chemically processed anode foil.

FIG. 26 is a perspective view showing a method of arranging chemically processed anode foils 24a, 24b and 24c, cathode foils 2a and 2b and the separator sheets when electrolytic capacitor 20B shown in FIG. 23 is fabricated by using three chemically processed anode foils 24a, 24b and 24c and two cathode foils 2a and 2b.

Referring to FIG. 26, when electrolytic capacitor 20B shown in FIG. 23 is formed by using three chemically processed anode foils 24a, 24b and 24c and two cathode foils 2a and 2b, electrolytic capacitor 20B includes a separator sheet 3h in addition to two separator sheets 3f and 3g.

Separator sheets 3f and 3g may be shorter than separator sheet 3h, as long as they are longer than cathode foils 2a and 2b. Cathode foil 2a is arranged between separator sheets 3 and 3h to be opposite to chemically processed anode foils 24a and 24b with separator sheet 3h interposed, and cathode foil 2b is arranged between separator sheets 3f and 3g to be opposite to chemically processed anode foils 24b and 24c with separator sheets 3g and 3h interposed.

Three chemically processed anode foils 24a, 24b and 24c, two cathode foils 2a and 2b, and three separator sheets 3f, 3g and 3h are arranged in the manner as shown in FIG. 26, and three chemically processed anode foils 24a, 24b and 24c, two cathode foils 2a and 2b, and three separator sheets 3f, 3g and 3h are rolled from rolling start ends 2A, 3A and 24A in the direction of rolling DR1, so that capacitor element 5 including three capacitor elements 5e, 5f and 5g is formed. At the point where chemically processed anode foil 24a, cathode foil 2a of the length 2L/3 and separator sheets 3f, 3g and 3h of the length 2L/3 are rolled, capacitor element 5e is formed, at the point where chemically processed anode foil 24b, cathode foil 2a of the length L/3, cathode foil 2b of the length L/3 and separator sheets 3f, 3g and 3h of the length 2L/3 are rolled, capacitor element 5f is formed, and at the point where chemically processed anode foil 24c, cathode foil 2b of the remaining length 2L/3 and separator sheets 3f, 3g and 3h of the remaining length 2L/3 are rolled, capacitor element 5g is formed.

Therefore, capacitor element 5e is arranged on the innermost circumferential side, capacitor element 5f is arranged on the outer side of capacitor element 5e, and capacitor element 5g is arranged on the outermost circumferential side.

After forming capacitor element 5 by rolling three chemically processed anode foils 24a, 24b and 24c, two cathode foils 2a and 2b and three separator sheets 3f, 3g and 3h, electrolytic capacitor 20B is fabricated by the same method as that of fabricating electrolytic capacitor 10.

In FIG. 26, cathode foil 2a may be arranged between separator sheets 3f and 3g to be opposite to chemically processed anode foils 24a and 24b with separator sheets 3g and 3h interposed, and cathode foil 2b may be arranged between separator sheets 3g and 3h to be opposite to chemically processed anode foils 24b and 24c with separator sheet 3h interposed.

Further, in FIGS. 25 and 26, three chemically processed anode foils 24a, 24b and 24c may be arranged in the manner as shown in FIG. 22. In that case, electrolytic capacitor 20B comes to include additional one separator sheet 3h or two separator sheets 3h and 3i.

In electrolytic capacitor 20B, lead tab terminal 9 may be arranged on one end 2C of cathode foil 2b.

Except for this point, it is the same as Embodiment 1.

In Embodiment 2 above, an example in which an electrolytic capacitor is fabricated by using two chemically processed anode foils and one cathode foil, an example in which an electrolytic capacitor is fabricated by using three chemically processed anode foils and one cathode foil, and an example in which an electrolytic capacitor is fabricated by using three chemically processed anode foils and two cathode foils have been described. The present invention is not limited to these examples, and the electrolytic capacitor in accordance with Embodiment 2 generally encompasses an electrolytic capacitor fabricated by using i (i is an integer not smaller than 2) chemically processed anode foils and j (j is an integer satisfying $1 \leq j < i$) cathode foils, that is, smaller in number than i chemically processed anode foils.

In Embodiment 1 above, examples in which electrolytic capacitor is fabricated by using two or more, same number of chemically processed anode foils and cathode foils have been described, and in Embodiment 2, examples in which electrolytic capacitor is fabricated by using a plurality of chemically processed anode foils and one or more cathode foils smaller in number than the plurality of chemically processed anode foils have been described.

Therefore, the electrolytic capacitor in accordance with the present invention generally encompasses an electrolytic capacitor fabricated by using i chemically processed anode foils, j (j is an integer satisfying $1 \leq j \leq i$) cathode foils and k (k is an integer not smaller than 2) separator sheets. Here, i chemically processed anode foils are electrically insulated from each other, and j cathode foils are electrically insulated from each other when j is 2 or larger.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. A rolled electrolytic capacitor including an electrolyte, comprising:
    i (i is an integer not smaller than 2) anode members electrically insulated from each other and each having a dielectric coating film on a surface;
    j (j is an integer satisfying $1 \leq j < i$) cathode members rolled together with said i anode members; and
    k (k is an integer not smaller than 2) separator members arranged at least between said i anode members and said j cathode members, and rolled together with said i anode members and said j cathode members,
    wherein said i anode members, said j cathode members and said k separator members are rolled from a central portion in a longitudinal direction of a pair of separator members sandwiching at least one cathode member.

2. The electrolytic capacitor according to claim 1, wherein said i anode members, said j cathode members and said k separator members form a plurality of capacitors having mutually different capacitances.

3. The electrolytic capacitor according to claim 1, further comprising
    a sealing member for sealing a capacitor element formed by rolling said i anode members, said j cathode members and said k separator members; wherein
    said sealing member is formed of resin.

4. The electrolytic capacitor according to claim 1, further comprising
    a sealing member for sealing a capacitor element formed by rolling said i anode members, said j cathode members and said k separator members; wherein
    said sealing member is formed of rubber.

5. The electrolytic capacitor according to claim 1, wherein said electrolyte is solid electrolyte formed of polythiophene-group, polypyrrole-group or polyaniline-group conductive polymer or solid electrolyte of 7,7,8,8-tetracyano-quinodimethane complex salt.

6. The electrolytic capacitor according to claim 1, wherein said i anode members include two anode members,
    said j cathode members include one cathode member, and
    said k separator members include two separator members.

7. The electrolytic capacitor according to claim 1, further comprising
    i anode terminals are connected to said i anode members, respectively, and
    i cathode terminals are connected to said j cathode members.

* * * * *